United States Patent
Kilgore et al.

(10) Patent No.: US 11,238,444 B2
(45) Date of Patent: Feb. 1, 2022

(54) SECURE AND TRUSTED CRYPTOCURRENCY ACCEPTANCE SYSTEM

(71) Applicant: Flexa Network Inc., New York, NY (US)

(72) Inventors: Zachary Kilgore, Brooklyn, NY (US); Tyler Robert Spalding, New York, NY (US); Trevor Filter, New York, NY (US)

(73) Assignee: Flexa Network Inc., New York, NY (US)

( * ) Notice: Subject to any disclaimer, the term of this patent is extended or adjusted under 35 U.S.C. 154(b) by 143 days.

(21) Appl. No.: 16/695,459

(22) Filed: Nov. 26, 2019

(65) Prior Publication Data

US 2021/0158443 A1    May 27, 2021

(51) Int. Cl.
*G06Q 20/38* (2012.01)
*G06Q 40/04* (2012.01)
(Continued)

(52) U.S. Cl.
CPC ....... *G06Q 20/381* (2013.01); *G06Q 20/0655* (2013.01); *G06Q 20/223* (2013.01);
(Continued)

(58) Field of Classification Search
CPC .............................. G06Q 20/381; G06Q 40/04
See application file for complete search history.

(56) References Cited

U.S. PATENT DOCUMENTS 10,540,639 B2 *  1/2020  Brock ................... G06Q 20/06
10,915,895 B1 *  2/2021  Fogg .................... G06Q 20/389
(Continued)

FOREIGN PATENT DOCUMENTS

| KR | 101923943 B1 | 2/2019 |
|---|---|---|
| KR | 1020190082620 A | 7/2019 |
| KR | 1020190099545 A | 8/2019 |

OTHER PUBLICATIONS

International Searching Authority; International Search Report and Written Opinion; International Application No. PCT/US2020/060894; dated Mar. 15, 2021; 7 pgs.

*Primary Examiner* — Jay Huang
(74) *Attorney, Agent, or Firm* — Garlick & Markison; Timothy W. Markison; Patricia M. Healy

(57) ABSTRACT

A method includes initiating, by a payor computing device, a financial transaction to send payment of a particular amount to a payee computing device using a first cryptocurrency. The payee computing device accepts a desired currency. The method further includes placing a hold on an amount of collateral cryptocurrency based on a request to process the financial transaction. The method further includes sending, by the payor computing device, a first amount of the first cryptocurrency equal to the particular amount to the cryptocurrency acceptance network computing device, converting, by a cryptocurrency exchange device, the first amount of the first cryptocurrency to an amount of the desired currency equal to the particular amount, and sending the amount of the desired currency to a payee banking computing device. The method further includes seeking a desired number of confirmations of the first amount of the first cryptocurrency from a consensus network. When the desired number of confirmations is completed, the method further includes releasing the hold on the amount of the collateral cryptocurrency.

14 Claims, 21 Drawing Sheets

(51) Int. Cl.
    *G06Q 20/06*  (2012.01)
    *G06Q 20/36*  (2012.01)
    *G06Q 20/22*  (2012.01)
    *G06Q 20/10*  (2012.01)
(52) U.S. Cl.
    CPC ......... *G06Q 20/3678* (2013.01); *G06Q 40/04* (2013.01); *G06Q 20/10* (2013.01); *G06Q 2220/00* (2013.01)

(56) References Cited

U.S. PATENT DOCUMENTS

| | | | |
|---|---|---|---|
| 2016/0071096 A1* | 3/2016 | Rosea | G06Q 20/36 705/67 |
| 2019/0141045 A1* | 5/2019 | Stocker | H04L 9/3247 |
| 2019/0213586 A1* | 7/2019 | Baratam | G06Q 20/3825 |
| 2019/0356638 A1* | 11/2019 | Filter | G06Q 20/3829 |

\* cited by examiner

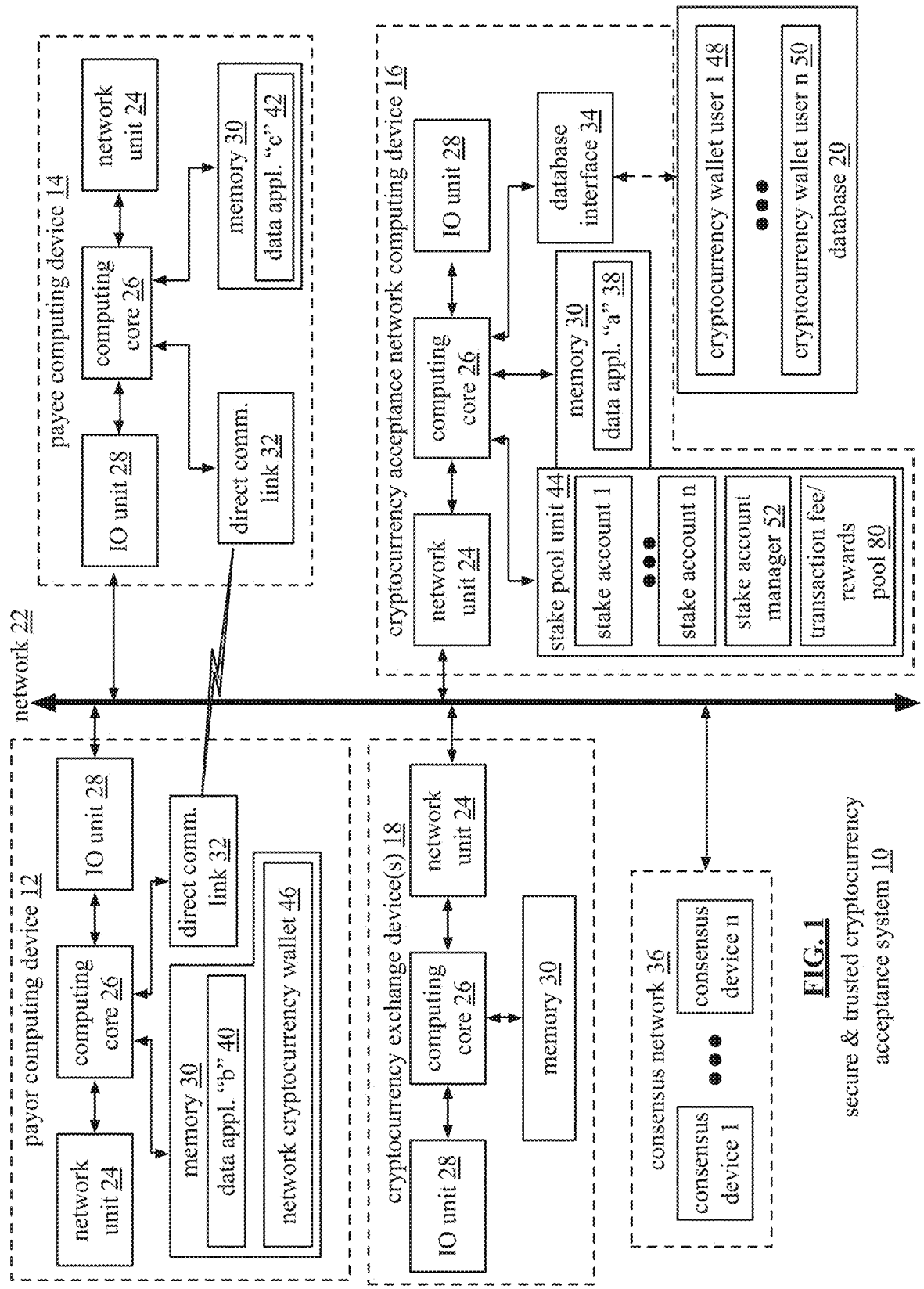
FIG. 1 secure & trusted cryptocurrency acceptance system 10

92 determine, by a stake account manager, to distribute rewards to one or more stake accounts of a stake pool, where a stake account of the one or more stake accounts is a smart contract on a blockchain

↓

94 obtain, by the stake account manager, privately stored stake account information of the one or more stake accounts and a rewards balance of the stake pool

↓

96 calculate, by the stake account manager, a reward amount of the rewards balance owed to each stake account of the one or more stake accounts based on the privately stored stake account information

↓

98 perform, by the stake account manager, a batched and secure calculation technique on the calculated reward amounts to produce a batched and secure rewards distribution summary

↓

100 publish, by the stake account manager, the batched and secure rewards distribution summary to the blockchain, where the publishing deposits a corresponding calculated reward amount to the each stake account

FIG. 12 secure & trusted cryptocurrency acceptance system 10

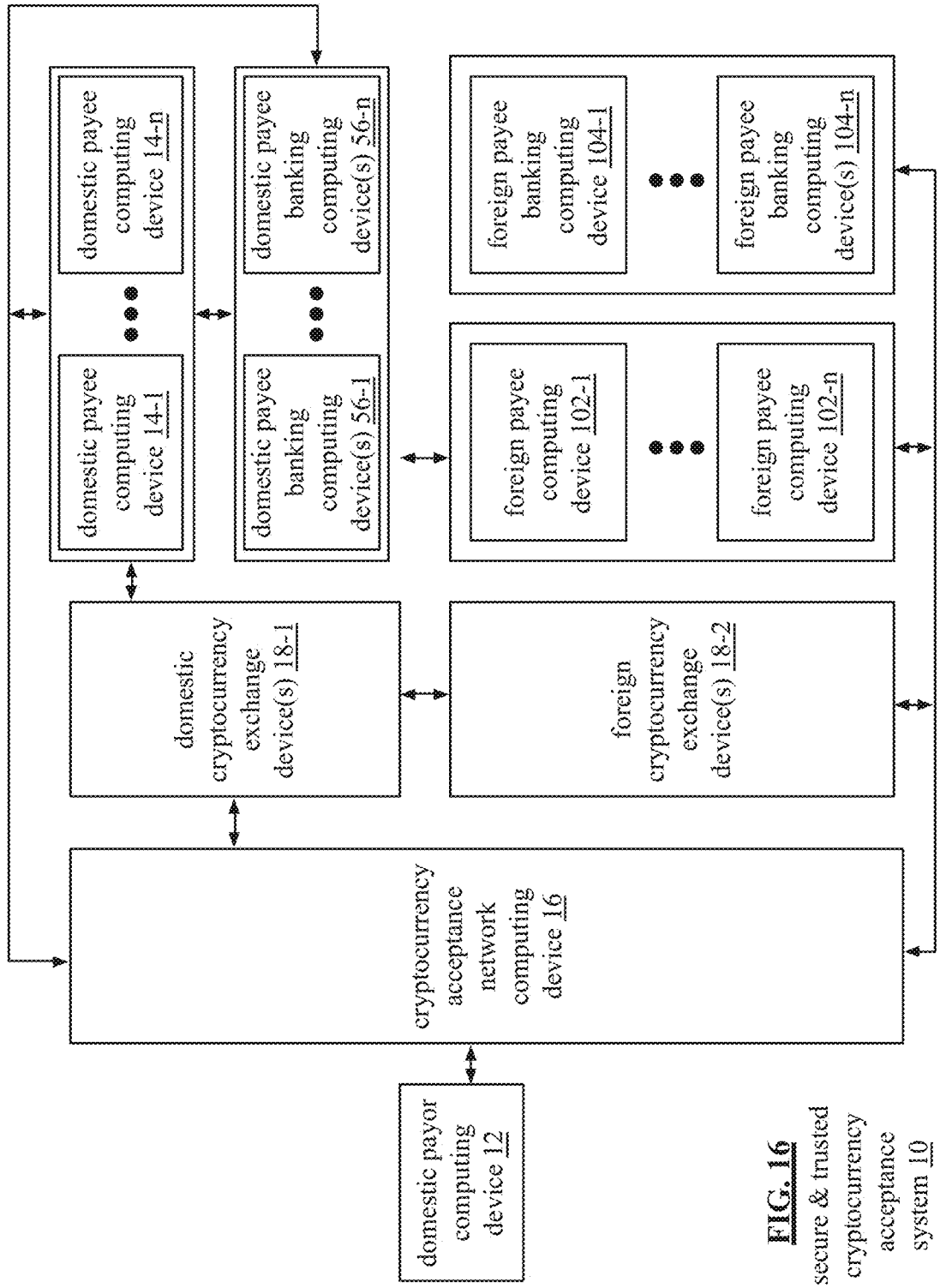

SECURE AND TRUSTED CRYPTOCURRENCY ACCEPTANCE SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to secure and trusted financial transactions involving cryptocurrency and more particularly to a secure and trusted cryptocurrency acceptance system.

Description of Related Art

Current payment systems are vulnerable to security breaches, fraud, and identity theft. A typical payment card transaction with a merchant involves several steps (e.g., card authorization, clearing, and settlement) and the participation of various entities (e.g., financial institutions, credit card companies, and a payment processing networks). Each step and each entity has its own varying security problems (e.g., hacking).

The steps involved are also inconvenient, time consuming, and expensive. For example, card authorization (e.g., credit or debit card authorization) begins with the cardholder presenting the card to a merchant for goods or service. The card is issued by a particular financial institution (e.g., a bank) and is associated with a credit card company (e.g., Visa, Mastercard, etc.). The merchant uses a credit card machine, software, or gateway to transmit transaction data to their acquiring bank (or its processor). The acquiring bank routes the transaction data to a payment processing network and the payment processing network sends the transaction data to the cardholder's issuing bank. The issuing bank validates that the card has not been reported stolen or lost, confirms whether funds are available, and sends a response code back through the payment processing network to the acquiring bank as to whether the transaction is approved.

The transaction data typically includes the card number, transaction amount, date, merchant's name, merchant's location, merchant category code, and an encrypted personal identification number (PIN) if entered. The response code reaches the merchant's terminal and is stored in a file until it is settled. The merchant sends the stored, approved transactions to its acquiring back (e.g., at the end of the day) and the acquiring bank reconciles and transmits approved transactions through the appropriate card-processing network. The acquiring bank deposits funds from sales into the merchant's account. The payment processing network debits the issuing bank account and credits the acquiring bank account for the amount of the transaction.

Merchants pay substantial credit card processing fees and those costs are passed along to consumers. Most merchants pay an interchange rate on a total transaction and a flat fee to the credit card company involved (e.g., Visa, Mastercard, etc.). Rates vary based on the credit card company, the credit card type (e.g., credit, debit, business, etc.), processing type (e.g., online payment, swiped, through a mobile device, card not present, etc.), and a Merchant Category Code (MCC) that classifies a merchant's type of business. Further, merchants typically pay a commission and a flat fee to the payment processing network.

Mobile wallet applications allow cardholders to store card data on a computing device via a digital wallet for convenient transactions. For example, some mobile wallet apps use near field communication (NFC) for contactless payments (e.g., exchange of data by holding device over a payment reader). NFC chips are specifically designed to manage financial security and only store data needed to initiate and complete a transaction. Mobile wallets use types of tokenization to assign a device account number (DAN) in place of an account or card number so that the DAN is passed to the merchant rather than the actual account/card number. As another security measure, digital wallets rely on digital certificates to verify identity. However, using a digital wallet on a device means data passes through not only the device's hardware and operating system but then also a specific payment app, and then finally the source of payment. Further, user fraud via mobile wallets is possible.

Distributed ledger technology (e.g., a blockchain) reduces the risk of fraudulent activity. For example, a blockchain is an immutable ledger for recording transactions within a network, consisting of a continuously growing list of blocks (i.e., groups of transactions) that are securely linked, continually reconciled, and shared among all network participants (i.e., a decentralized network). Transactions are validated and added to blocks via hashing algorithms, and then permanently written to the chain via consensus of the entire network. Once recorded on the blockchain, transactions cannot be altered.

A cryptocurrency is a digital asset that is securely created and transferred via cryptography. Many cryptocurrencies are distributed networks based on distributed ledger technology (e.g., a blockchain). Decentralized networks like Bitcoin use pseudo-anonymous transactions that are open and public (i.e., anyone can join, create, and view transactions). To minimize fraudulent activity and deter malicious network activity, cryptocurrency transactions can be recorded by "miners" using "proof of work" secure hashing algorithms (SHA-256) that require significant computing power. While many cryptocurrencies are blockchain based, other distributed ledger technologies may be used. For example, asynchronous consensus algorithms enable a network of nodes to communicate with each other and reach consensus in a decentralized manner. This method does not need miners to validate transactions and uses directed acyclic graphs for time-sequencing transactions without bundling them into blocks.

BRIEF DESCRIPTION OF THE SEVERAL VIEWS OF THE DRAWING(S)

FIG. 1 is a schematic block diagram of an embodiment of a secure & trusted cryptocurrency acceptance system in accordance with the present invention;

FIG. 12 is a flowchart of an example of a method of calculating stake account rewards withdrawal in accordance with the present invention;

FIG. 16 is a schematic block diagram of another embodiment of the secure & trusted cryptocurrency acceptance system.

DETAILED DESCRIPTION OF THE INVENTION

Figure 2A:
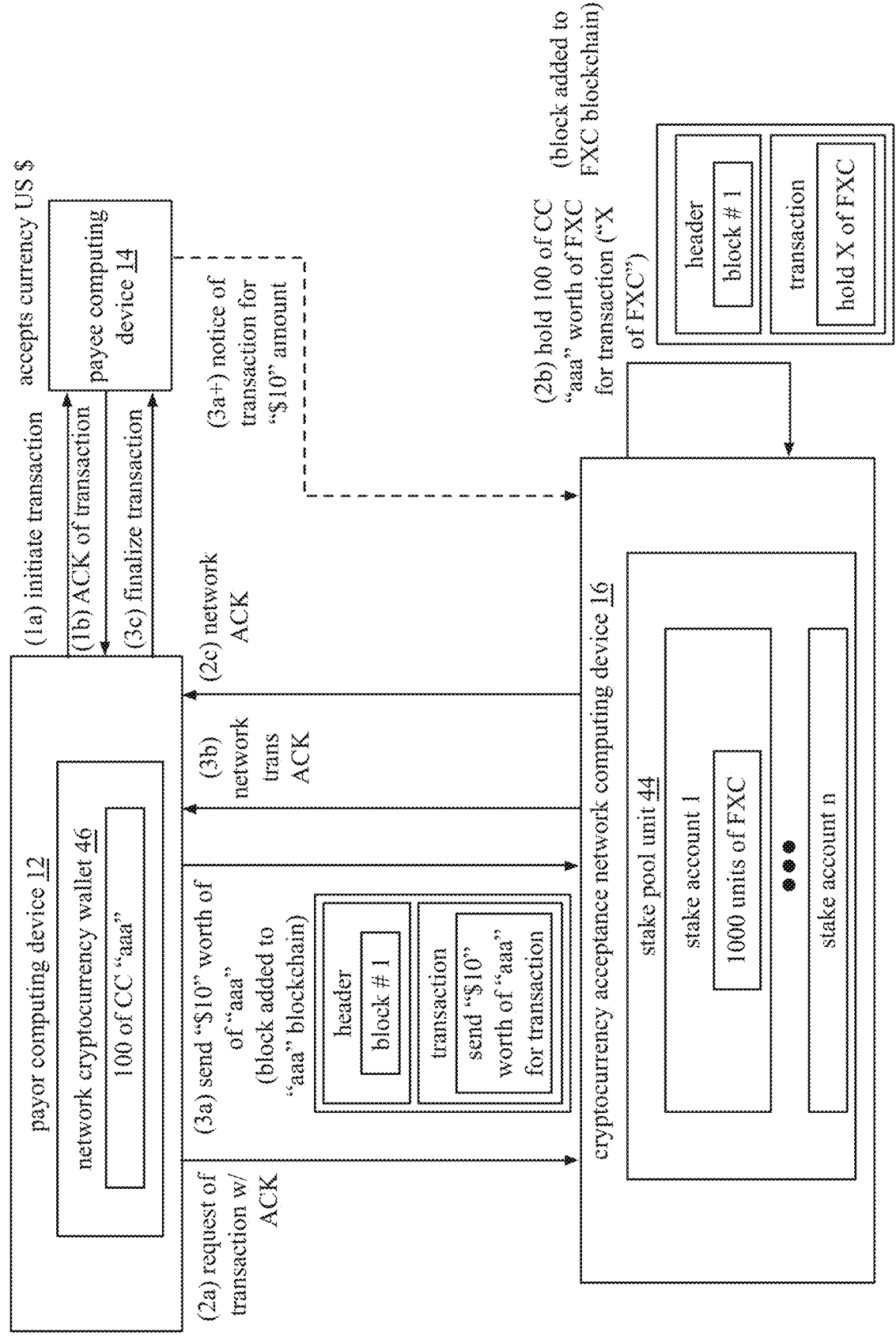
FIGS. 2A-2C are flowcharts of an example of a method of a financial transaction of the secure & trusted cryptocurrency acceptance system in accordance with the present invention.

FIG. 1 is a schematic block diagram of an embodiment of a secure & trusted cryptocurrency acceptance system 10 that includes a payor computing device 12, a payee computing device 14, a cryptocurrency acceptance network computing device 16, one or more cryptocurrency exchange device(s) 18, a database 20, and a consensus network 36 that includes a plurality of consensus devices 1-n. The secure & trusted cryptocurrency acceptance system 10 enables secure and trusted financial transactions between a payor computing device 12 paying with a cryptocurrency and a payee computing device 14 accepting a desired currency (e.g., fiat currency) to overcome one or more of the following issues.

At the filing of this application, cryptocurrency is not widely accepted by merchants as a form of payment for a variety of reasons. For example, the value of cryptocurrency can be volatile, sometimes fluctuating dramatically in the course of one day. As another example, merchants are reluctant to invest in expensive point-of-sale upgrades to accommodate cryptocurrency payments directly. As yet another example, most customers and merchants do not wish to have their transactions made public, which would occur since many cryptocurrency payments are public.

While some developed digital wallets applications have been developed to enable retail blockchain payments, they are universally dependent on existing payment networks and thus are susceptible to fraud attacks of the existing payment networks. For example, a cryptocurrency is linked to a credit card, where a cryptocurrency payment is converted and conducted as a credit card transaction and, thus susceptible to the same fraud attacks as credit cards.

Even though cryptocurrencies significantly reduce fraudulent activity as compared to traditional payment systems, fraudulent cryptocurrency transactions are still possible. For example, malicious users can manipulate a cryptocurrency blockchain to "double spend" (e.g., create one block to transfer an amount to a merchant and another block to transfer the amount back to him or herself). As another example, malicious or faulty digital wallet software can prevent a cryptocurrency transaction from being authorized and completed correctly.

Within the secure & trusted cryptocurrency acceptance system 10 the payor computing device 12, the payee computing device 14, the cryptocurrency acceptance network computing device 16, the one or more cryptocurrency exchange device(s) 18, and the consensus devices 1-n may be portable computing devices and/or a fixed computing devices. A portable computing device may be a social networking device, a gaming device, a cell phone, a smart phone, a digital assistant, a digital music player, a digital video player, a laptop computer, a handheld computer, a tablet, a video game controller, a portable merchant point-of-sale (POS) device (e.g., a mobile device with POS capabilities) and/or any other portable device that includes a computing core 26. A fixed computing device may be a computer (PC), a computer server, a cable set-top box, a satellite receiver, a television set, a printer, a fax machine, home entertainment equipment, a video game console, a fixed merchant point-of-sale (POS) device (e.g., cash register), and/or any type of home or office computing equipment.

The network 22 includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

Each of the payor computing device 12, the payee computing device 14, the cryptocurrency acceptance network computing device 16, the one or more cryptocurrency exchange device(s) 18, and the consensus devices 1-n includes a network unit 24, a computing core 26, an input/output (IO) unit 28, and a memory 30. Each network unit 24 includes software and hardware to support one or more communication links via the network 22 directly and/or indirectly. For example, the network unit 24 of the payor computing device 12 supports a network 22 communication link between the payor computing device 12 and the devices 14-16. The computing cores 26 include one or more of: one or more processing modules, one or more main memories (e.g., RAM), a core control module, a video graphics processing module, an IO control module, and a peripheral interface control module.

The IO units 28 enable connections between devices 12-18 and user inputs/peripheral devices. Unit inputs/peripheral devices include one or more of an external hard drive, headset, a keypad, a keyboard, control switches, a touchpad, a speaker, a microphone, a thumb drive, a camera, etc.

The memories 30 include one or more of main memory (RAM), hard drives, solid-state memory chips, one or more other large capacity storage devices, and/or cache memory. The memories 30 store operational instructions for the computing cores 26. For example, the payor computing device 12 memory 30 stores data application "b" 40, the cryptocurrency acceptance network computing device 16 memory 30 stores data application "a" 38, and the payee computing device 16 memory 30 stores data application "c" 42. The payor computing device 12 memory 30 further stores a network cryptocurrency wallet 46. The various applications stored by the devices support secure and trusted cryptocurrency transactions within the system as described herein.

The database 20 is a special type of computing device that is optimized for large scale data storage and retrieval. The database 20 includes similar components to that of the devices 12-18 with more hard drive memory (e.g., solid state, hard drives, etc.) and potentially with more processing modules and/or main memory. Further, the database 20 is typically accessed remotely; as such it does not generally include user input devices and/or user output devices. An embodiment of a database 20 may include a standalone separate computing device and/or may be a cloud computing device.

The database 20 includes cryptocurrency wallets for users 1-n 48-50. The cryptocurrency acceptance network computing device 16 and the database 20 are secure devices implementing high level security protocols to prevent unauthorized use, hacking, etc. For example, the database 20 is a cryptocurrency holding company separate from the cryptocurrency acceptance network computing device 16 that has been specially licensed to store sensitive materials and has insurance policies to protect against theft and fraud.

The cryptocurrency exchange device(s) 18 are specially licensed entities operable to convert cryptocurrency to a desired currency (e.g., fiat currency, another cryptocurrency, etc.). In an embodiment, the cryptocurrency exchange device(s) 18 are associated with one or more cryptocurrency holding companies that are specially licensed to store sensitive materials and have insurance policies to protect against theft and fraud. In another embodiment, cryptocurrency exchange device(s) 18 are standalone secure devices.

The cryptocurrency exchange device(s) 18 may be associated with a stored value account (SVA) device where the SVA device is associated with the payee computing device 14 (e.g., the payee computing device has an SVA account with the SVA device) such that the one or more of the cryptocurrency exchange device(s) 18 are operable to generate SVAs for transactions. In another embodiment, one or more of the cryptocurrency exchange device(s) 18 and the cryptocurrency acceptance network computing device 16 are operable to generate stored value accounts (SVAs) and/or are associated with one or more entities operable to generate SVAs. Generation of SVAs for transactions is described in co-pending patent application Ser. No. 16/376,911, entitled, "SECURE AND TRUSTED DATA COMMUNICATION SYSTEM," filed Apr. 5, 2019.

The cryptocurrency acceptance network computing device 16 further includes a database interface 34 that enables a connection between the cryptocurrency acceptance network computing device 16 and the database 20. The payor computing device 12 and the payee computing device 14 include a direct communication unit 32 that allows for a direct communication between them. For example, the direct communication unit 32 includes technology to establish a direct link between the payor computing device 12 and the payee computing device 14 via video, infrared (IR), near-field communication (NFC), etc.

The payee computing device 14 may be one or more computing devices having an affiliation with a specific merchant identifier (ID). For example, the payee computing device 14 is a point of sale (POS) device in a retail store associated with a particular merchant having the specific merchant ID. The payee computing device 14 is associated with the cryptocurrency acceptance network computing device 16. For example, the payee computing device has an account with the cryptocurrency acceptance network computing device 16. The account setup establishes data application "c" 42 in the payee computing device 14's memory 30 and includes instructions for securely receiving payments via the secure & trusted cryptocurrency acceptance system 10.

The payor computing device 12 is associated with a user and is associated with the cryptocurrency acceptance network computing device 16. For example, the payor computing device 12 (e.g., a user's smart phone) downloads and stores the network cryptocurrency wallet 46 which includes data application "b" 40, and the network cryptocurrency wallet 46 is associated with the cryptocurrency acceptance network computing device 16. For example, the network cryptocurrency wallet 46 may be a secure custodial digital wallet managed by the cryptocurrency acceptance network computing device 16 (e.g., via database 20). In this example, the payor computing device 12 (e.g., user 1) sets up a user account with the cryptocurrency acceptance network computing device 16 for the secure and trusted storage of cryptocurrency via the network cryptocurrency wallet 46. The payor computing device 12 initiates user account set-up and downloads data application "b" 40 which includes instructions for cryptocurrency management, storage, and transactions.

The cryptocurrency acceptance network computing device 16 memory 30 stores data application "a" 38, which has instructions for cryptocurrency management, conveyance, and storage via the database 20 (e.g., user cryptocurrency wallet creation and management, etc.). For example, upon the payor computing device 12's user account set up, the cryptocurrency acceptance network computing device 16 generates one or more cryptocurrency wallets associated with the payor computing device 12 in the database 20. For example, the cryptocurrency acceptance network computing device 16 generates the cryptocurrency wallet user 1 48 in the database 20 for secure storage of the payor computing device 12's cryptocurrency.

The cryptocurrency acceptance network computing device 16 functions to store cryptocurrency on behalf of a payor computing device as described in co-pending patent application Ser. No. 16/376,911, entitled, "SECURE AND TRUSTED DATA COMMUNICATION SYSTEM," filed Apr. 5, 2019 (see secure data conveyance device 14 and user computing device 12).

As another example, the cryptocurrency acceptance network computing device 16 does not store cryptocurrency on behalf of the payor computing device 12. For example, the network cryptocurrency wallet 46 is managed by a digital wallet developer that is associated with the cryptocurrency acceptance network computing device 16. For example, the digital wallet developer has an account with the cryptocurrency acceptance network computing device 16. The digital wallet developer may be a custodial wallet that stores cryptocurrency on behalf of the payor computing device 12 or it may be a private wallet where only payor computing device 12 has access to network cryptocurrency wallet user's private key information. In either example, when the payor computing device 12 sets up a user account with the network cryptocurrency wallet 46, data application "b" 40 is installed which includes instructions on processing financial transactions using the network cryptocurrency wallet 46.

Each of the plurality of consensus devices 1-n of the consensus network 20 includes a network unit (e.g., like network unit 24), computing core (e.g., like computing core 26), IO unit (e.g., like IO unit 28), and is connected via the network 22. The consensus devices 1-n validate cryptocurrency transactions. For example, a consensus device uses "proof of work" secure hashing algorithms to validate a cryptocurrency transaction block (e.g., a "miner") and adds the block to the blockchain. When a transaction is validated enough times (i.e., enough blocks verifying the transaction are added to the blockchain), it is adopted by the consensus network 36 as valid (i.e., a consensus among the consensus devices 1-n is reached). As another example, the consensus devices 1-n use asynchronous consensus algorithms to communicate with each other and reach consensus in a decentralized manner. This method involves using directed acyclic graphs for time-sequencing transactions without bundling them into blocks. Other methods of decentralized consensus may be used.

The cryptocurrency acceptance network computing device 16 further includes a stake pool unit 44. The stake pool unit 44 includes one or more memory devices, or is part of another memory device (e.g., memory 30), and includes a processing module, or is part of a processing module of the computing core 26). The stake pool unit 44 stores information regarding stake accounts 1-n, includes a stake account manager 52, and stores information regarding a transaction fee/rewards pool 80. The stake accounts 1-n store collateral cryptocurrency to secure transactions within the secure & trusted cryptocurrency acceptance system 10. Collateral cryptocurrency is purchased from a set amount of system specific cryptocurrency created for use within the secure & trusted cryptocurrency acceptance system 10. In order to be recognized by the secure & trusted cryptocurrency acceptance system 10, a cryptocurrency wallet must be associated with a stake pool account that is backed with collateral cryptocurrency.

For example, a digital wallet developer creates an account with the cryptocurrency acceptance network computing device 16 in order for its wallet users to be a part of the secure & trusted cryptocurrency acceptance system 10. As part of the account set up, the digital wallet developer purchases and pledges a certain amount of collateral cryptocurrency into a stake account for purposes of backing the financial transactions of its wallet users. When the network cryptocurrency wallet 46 is managed by the cryptocurrency acceptance network computing device 16, the cryptocurrency acceptance network computing device 16 must also purchase and pledge collateral cryptocurrency into a stake account for its wallet users. An entity that pledges collateral cryptocurrency is referred to as a staking entity.

The stake account manager 52 manages the plurality of stake accounts 1-n. In an embodiment, the stake accounts 1-n are "on-chain" smart contracts such as an Ethereum blockchain smart contract (i.e., they are visible to everyone) but the stake account manager 52 stores information and conducts activities "off-chain" (i.e., privately). For example, the stake manager manages withdrawals of rewards from stake accounts, maintains an event log of stake pool activities, stores staking entity information (e.g., rewards percentage per successful transaction, terms of rewards withdrawals, etc.), and calculates the rewards owed to the staking entities at a given time.

In exchange for pledging collateral cryptocurrency, staking entities are provided rewards such as a percentage back on successful transactions completed by their wallet's users. Because of the incentives provided, a variety of staking entities (e.g., individual user computing devices, other wallet developers) may wish to pledge collateral cryptocurrency into one or more stake accounts. Therefore, a staking entity of the stake pool unit 44 includes one or more digital wallet developer/managers and potentially one or more other computing devices.

Because there is a finite amount of system cryptocurrency, the value of the system cryptocurrency will continue to grow and serve as further incentive for a variety of staking entities to obtain and pledge collateral cryptocurrency into stake accounts. Also, because incentives are provided based on successful transactions, digital wallet developers/managers are motivated to produce and maintain a secure digital wallet (e.g., no faulty software) and prevent and deter fraudulent activity by its users on the network. The stake pool unit 44 will be discussed in greater detail with reference to FIGS. 6-12.

In an example of operation, the payor computing device 12 establishes a direct communication link with the payee computing device 14 via the direct communication link 32 (e.g., NFC, IR, RF). The payor computing device 12 sends the payee computing device 14 a request to initiate purchase of a product or service using cryptocurrency stored in the network cryptocurrency wallet 46. The payee computing device 14 accepts a desired currency (e.g., fiat currency, a form of cryptocurrency, etc.).

The request to initiate purchase may be in the form of a split bar code, where the payor computing device 12 maintains one portion of a bar code and the payee computing device 14 maintains another portion of a bar code such that when they are aligned in close proximity, the conveyance is initiated. Having a correct piece of a barcode from the payor computing device 12 as well as the act of alignment, demonstrates intent to enter into a financial transaction (i.e., user authorization). As another example, the request is a secure handshake protocol between the payor computing device 12 and the payee computing device 14.

When the request to initiate the financial transaction is approved by the payee computing device 14 (e.g., via the split bar code example), the payor computing device 12 receives an acknowledgement of the financial transaction (e.g., a one-time use code such as a transaction ID) from the payee computing device 14. The one-time use code is one or more of: a unique number, an alpha numeric, a function, and/or any item that uniquely connects the parties in the transaction to the particular transaction. For example, the payee computing device 14 approves the request when the payee computing device 14 is affiliated with the cryptocurrency acceptance network computing device 16, the payor computing device 12 is a trusted computing device (e.g., by verification of ID, certificate, etc.), etc.

When a financial transaction is initiated by the payor computing device 12 using the network cryptocurrency wallet 46, the cryptocurrency acceptance network computing device 16 receives an acknowledgment of the initiation of the financial transaction and a request to process the financial transaction. For example, the payor computing device 12 sends the request to process the financial transaction plus the one-time use code to the cryptocurrency acceptance network computing device 16. The cryptocurrency acceptance network computing device 16 places a hold on an amount of collateral cryptocurrency in a stake account of the stake pool unit 44 associated with the network cryptocurrency wallet 46.

The amount of collateral cryptocurrency placed on hold may be determined based on one or more properties of the network cryptocurrency wallet 46 and/or the stake account associated with the network cryptocurrency wallet 46. For example, the amount of collateral cryptocurrency placed on hold is a default hold amount based on one or more of the payee computing device and the network cryptocurrency wallet. As a specific example, transactions involving a particular merchant require a default amount of collateral cryptocurrency placed on hold. As another specific example, transactions using a particular network cryptocurrency wallet may require a default amount of collateral cryptocurrency placed on hold regardless of the merchant or user involved.

As another example, the amount of collateral cryptocurrency placed on hold is based on the characteristics of one or more of the payor computing device 12, the payee computing device 14, and the stake account involved. As a specific example, the amount of collateral cryptocurrency placed on hold may be based on the amount of cryptocurrency the payor computing device 12 typically spends on an individual transaction. As another specific example, when the payee computing device 14 is associated with a high end merchant, a greater amount of collateral cryptocurrency is placed on hold. As yet another specific example, the amount of collateral cryptocurrency placed on hold may be based on the balance of the stake account. A higher balance may indicate that higher amounts of collateral cryptocurrency may be placed on hold for individual transaction.

As another example, the amount of collateral cryptocurrency placed on hold is based on the total amount of cryptocurrency currently stored in the network cryptocurrency wallet 46 by the payor computing device. As a specific example, the payor computing device 12 may spend any amount up to the full balance of what is stored on the network cryptocurrency wallet 46. Thus, the balance amount worth of collateral cryptocurrency is placed on hold to cover a transaction until more information is known.

When the amount of collateral cryptocurrency is placed on hold, the cryptocurrency acceptance network computing device 16 sends the payor computing device 12 an acknowledgment that the requisite amount of collateral cryptocurrency is on hold and the financial transaction can proceed. The payor computing device 12 sends an amount of cryptocurrency equal to the amount of desired currency requested by the payee computing device 14 to the cryptocurrency acceptance network computing device 16. Sending the amount of cryptocurrency equal to the amount of desired currency requested by the payee computing device to the cryptocurrency acceptance network computing device 16 is a transaction added to the cryptocurrency blockchain of the cryptocurrency used by the payor computing device 12.

The transaction information includes the payment amount, the sender cryptocurrency address (the payor computing device 12), and the recipient cryptocurrency address (the cryptocurrency acceptance network computing device 16). The transaction is then included within a block that is published on the blockchain. However, other details related to the transaction (e.g., the identity of the payee computing device, transaction fees owed by the payee computing device, etc.) are managed privately by the cryptocurrency acceptance network computing device 16 off-chain. Therefore, by using the secure & trusted cryptocurrency acceptance system 10, confidential payee related information (e.g., revenue, consumer spending behavior, etc.) and confidential payor related information (e.g., consumer identity of purchases, amount spent at a particular merchant, payees/merchants frequented, etc.) is private (i.e., not published on the blockchain for anyone to see).

Alternatively, or additionally, the payee computing device 14 sends a notice of the financial transaction which includes the amount of desired currency requested (e.g., an amount of US dollars) to the cryptocurrency acceptance network computing device 16. The cryptocurrency acceptance network computing device 16 sends the payor computing device 12 a network transaction acknowledgement that the amount of cryptocurrency has been received and is covered by the amount of collateral cryptocurrency placed on hold.

Alternatively, when the amount of desired currency requested is more than the amount of collateral cryptocurrency on hold, the cryptocurrency acceptance network computing device 16 may place further collateral cryptocurrency on hold to equal the amount of desired currency requested if allowed (e.g., by the terms of the stake account associated with the network cryptocurrency wallet 46). If not allowed, the cryptocurrency acceptance network computing device 16 cancels the transaction before the transaction is finalized between the payor computing device 12 and the payee computing device 14.

The payor computing device 12 sends the payee computing device 14 a notification to finalize the transaction. The notification to finalize the transaction includes the network transaction acknowledgement information from the cryptocurrency acceptance network computing device 16 (e.g., the amount of cryptocurrency has been received and is covered by the amount of collateral cryptocurrency placed on hold) such that the payee computing device 14 can close the financial transaction knowing that the desired funds will arrive.

The cryptocurrency acceptance network computing device 16 seeks a desired number of confirmations of payor computing device 12's cryptocurrency payment from the consensus network 20. The desired number of confirmations corresponds to the type of cryptocurrency used. Receipt of the desired number of confirmations may take minutes to hours of time.

For example, in the Bitcoin blockchain, miners record new transactions into blocks that verify all previous transactions within the blockchain. On average, it takes a miner ten minutes to write a block on the Bitcoin blockchain and the average block time depends on a total hash power of the Bitcoin network. Once a block is created and a new transaction is verified and included in a block, the transaction will have one confirmation. Each subsequent block (which verifies the previous state of the blockchain) provides one additional network confirmation. Typically, between 5-10 transaction confirmations are acceptable for cryptocurrency exchanges to avoid losses due to potential fraud. Therefore, if the payor computing device 12 is using Bitcoin, the transaction may not be confirmed by the consensus network 36 (i.e., Bitcoin miners) for an hour or more.

However, because every financial transaction is backed with collateral cryptocurrency, the cryptocurrency acceptance network computing device 16 proceeds with the financial transaction and is guaranteed that the desired amount of confirmations will be received.

The cryptocurrency acceptance network computing device 16 adjusts the amount of collateral cryptocurrency on hold to equal the amount of desired currency requested when the amount of desired currency requested is less than the amount of collateral cryptocurrency on hold. For example, if the equivalent of $20 worth of collateral cryptocurrency is placed on hold but the transaction specifies a payment amount of $10, the cryptocurrency acceptance network computing device 16 releases the hold on $10 worth of the $20 worth of collateral cryptocurrency that is not required to back the transaction.

The cryptocurrency acceptance network computing device 16 sends the amount of cryptocurrency sent by the payor computing device 12 to the cryptocurrency exchange device(s) 18. The cryptocurrency exchange device(s) 18 convert the amount of cryptocurrency sent by the payor computing device 12 to an amount equal to the amount of desired currency requested by the payee computing device 14. Cryptocurrency exchange is done quickly (e.g., 30 seconds to a few minutes) to account for exchange rate volatility. The exchange can also be performed in real time on a credit-based account to eliminate any pricing volatility. The cryptocurrency exchange device(s) 18 deposit the amount equal to the amount of desired currency requested by the payee computing device 14 into a payee banking computing device associated with the payee computing device 14.

Alternatively, the cryptocurrency exchange device(s) 18 deposit the amount equal to the amount of desired currency requested by the payee computing device 14 into a cryptocurrency acceptance system banking device of the secure & trusted cryptocurrency acceptance system and the cryptocurrency acceptance system banking device deposits the amount equal to the amount of desired currency into the payee banking computing device. The payee banking computing device sends a receipt of the deposit of the amount of desired currency plus a transaction fee to the cryptocurrency acceptance network computing device 16.

Transaction fees are accumulated and used to purchase system specific cryptocurrency for distribution to one or more of stake accounts 1-*n* as rewards. The transaction fees are stored in the transaction fee/rewards pool 80 of the stake pool unit 44 until a distribution of rewards occurs (e.g., upon request by a staking entity, at a predetermined time, or after a certain amount of transactions occur etc.). The stake account manager 52 calculates rewards owed using a zero knowledge proof smart contract to batch and distribute rewards to one or more stake accounts. A more detailed discussion of the stake account manager 52 and rewards calculation will be discussed with reference to FIGS. 8-9.

In another embodiment, the cryptocurrency acceptance network computing device 16 is further operable to instruct the cryptocurrency exchange device(s) 18 to convert the amount of cryptocurrency sent by the payor computing device 12 to an SVA in the amount equal to or more than the amount of desired currency requested by the payee computing device 14. Use of an SVA is another method of securing financial transactions of the secure & trusted cryptocurrency acceptance system 10. An SVA is valid for a particular financial transaction, expires in a short period of time (e.g., a few seconds, 30 seconds, one minute, or more) if not properly received by the payee computing device 14, and is only usable by the payee computing device 14. If a remaining balance exists after the transaction, the SVA is adjusted automatically to the actual spent amount. Creation and use of an SVA happens very quickly in order to minimize the volatility aspects of cryptocurrency conversion.

When the desired number of confirmations are received for the transaction between computing device 12 payee computing device 14 by the cryptocurrency acceptance network computing device 16 from the consensus network 36, the cryptocurrency acceptance network computing device 16 releases the hold on the amount of collateral cryptocurrency.

If fraudulent activity occurs (e.g., the payor computing device acts maliciously to spend at two payee computing devices simultaneously, the software of the network cryptocurrency wallet 46 is corrupted, etc.) the cryptocurrency acceptance network computing device 16 withdraws the collateral cryptocurrency on hold from the stake account. For example, if the payor computing device 12 attempts to double spend a transaction, the desired number of confirmations will not be received. If the desired number of confirmations are not received, the cryptocurrency acceptance network computing device 16 withdraws the amount of collateral cryptocurrency on hold to cover the transaction that occurred with the payee computing device 14.

As another example, if the payor computing device 12 sends the cryptocurrency to the cryptocurrency acceptance network computing device 16 through an error in the software of the network cryptocurrency wallet 46 (e.g., the network cryptocurrency wallet 46 experiences an error and allows a user to spend money it does not have) the desired number of confirmations will also not be received. If the desired number of confirmations are not received, the cryptocurrency acceptance network computing device 16 withdraws the amount of collateral cryptocurrency on hold to cover the transaction that occurred with the payee computing device 14.

As another example, the network cryptocurrency wallet 46 may send a financial transaction failure notification to the cryptocurrency acceptance network computing device 16 when the transaction occurs through an error in the software of the network cryptocurrency wallet 46. If the error is recognized by the payor computing device 12's network cryptocurrency wallet 46 after finalization of the transaction with the payee computing device 14 but prior to the cryptocurrency acceptance network computing device 16 receiving the desired amount of confirmations, the network cryptocurrency wallet 46 sends the financial transaction failure notification to the cryptocurrency acceptance network computing device 16. The amount of cryptocurrency spent is requested back, and the cryptocurrency acceptance network computing device 16 withdraws the amount of collateral cryptocurrency on hold to cover the transaction that occurred with the payee computing device 14.

Figure 2B:
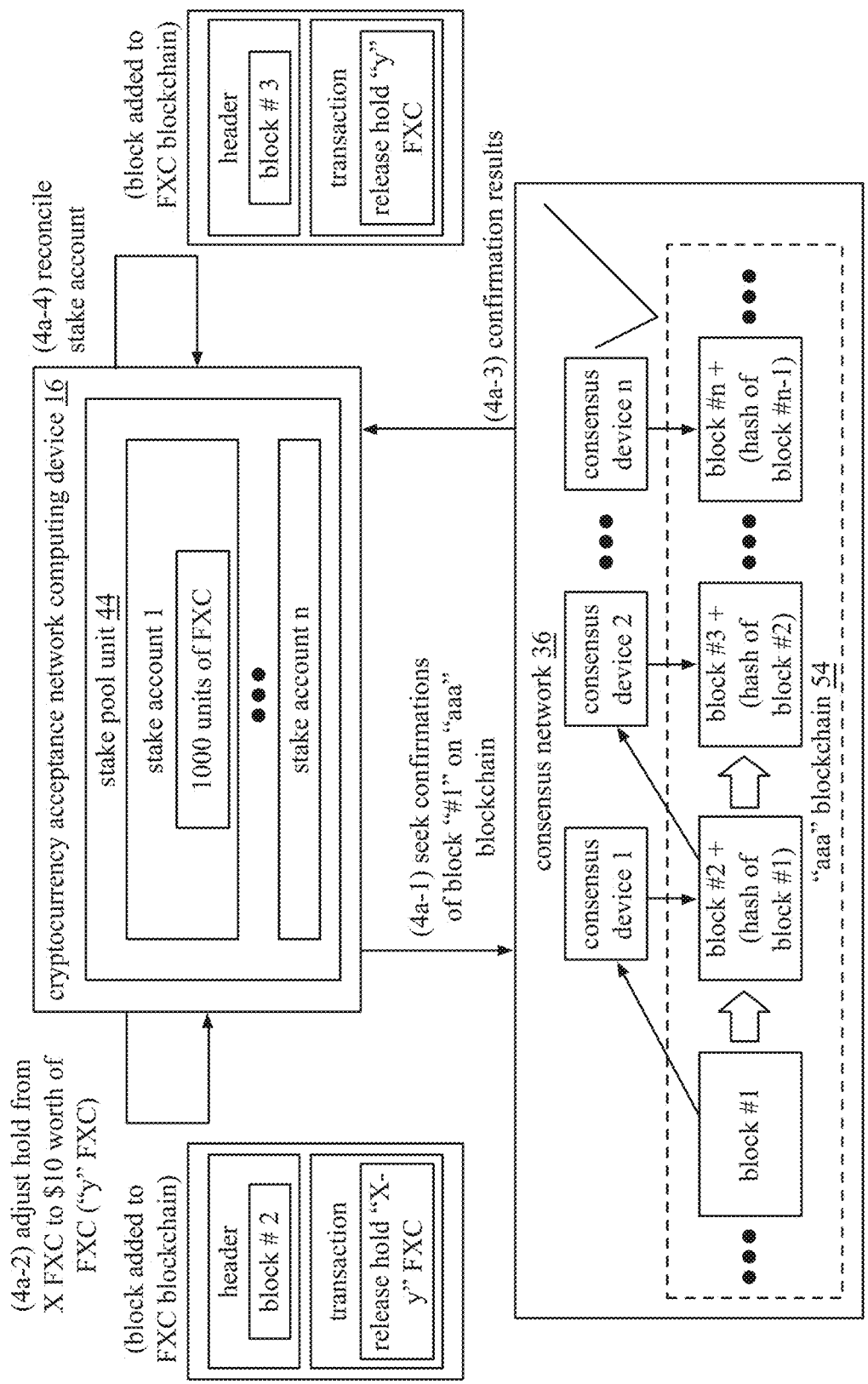
Figure 2C:
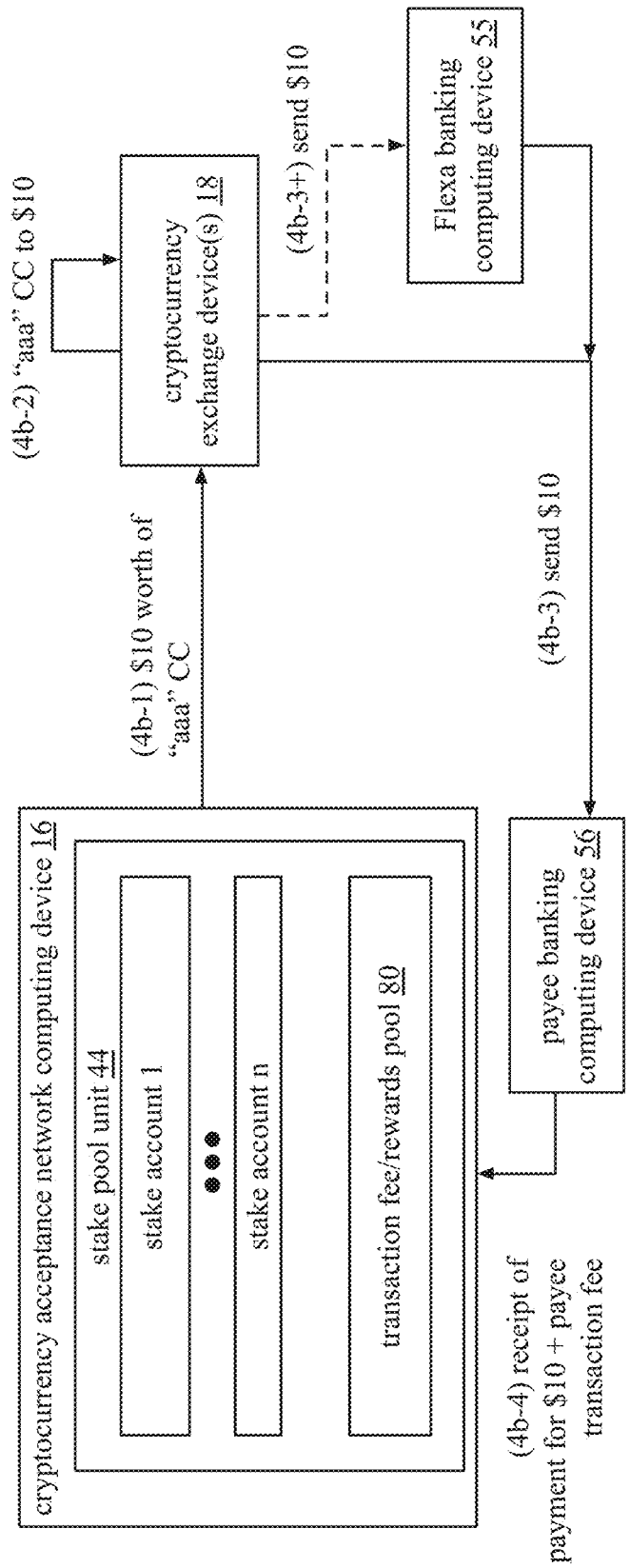

FIGS. 2A-2C are flowcharts of an example of a method of a financial transaction of the secure & trusted cryptocurrency acceptance system 10 of FIG. 1. The method begins on FIG. 2A with step (1*a*) where the payor computing device 12 establishes a direct communication link with the payee computing device 14 to initiate a financial transaction. The payor computing device 12's network cryptocurrency wallet 46 is storing 100 units of a cryptocurrency (CC) "aaa" (i.e., a first cryptocurrency). Cryptocurrency "aaa" may be any type of cryptocurrency approved for exchange by the one or more cryptocurrency exchange device(s) 18. In this example, the payor computing device 12 wishes to pay the payee computing device 14 using cryptocurrency "aaa," but the payee computing device 14 accepts US dollars.

The request to initiate purchase at step (1a) may be in the form of a split bar code, where the payor computing device 12 maintains one portion of a bar code and the payee computing device 14 maintains another portion of a bar code such that when they are aligned in close proximity, the conveyance is initiated. Having a correct piece of a barcode from the payor computing device 12 as well as the act of alignment, demonstrates intent to enter into a financial transaction (i.e., user authorization). As another example, the request is a secure handshake protocol between the payor computing device 12 and the payee computing device 14.

The method continues at step (1b) where the payor computing device 12 receives an acknowledgement of the financial transaction (e.g., a one-time use code such as a transaction ID) from the payee computing device 14. The one-time use code is one or more of: a unique number, an alpha numeric, a function, and/or any item that uniquely connects the parties in the transaction to the particular transaction. For example, the payee computing device 14 approves the request when the payee computing device 14 is associated with the cryptocurrency acceptance network computing device 16 and the terms of the transaction are valid.

The method continues at step (2a) where, when a financial transaction is initiated by the payor computing device 12 using the network cryptocurrency wallet 46, the cryptocurrency acceptance network computing device 16 receives an acknowledgment of the initiation of the financial transaction and a request to process the financial transaction. For example, the payor computing device 12 sends the request to process the financial transaction plus the one-time use code to the cryptocurrency acceptance network computing device 16.

The cryptocurrency acceptance network computing device 16 includes the stake pool unit 44. The stake pool unit 44 includes a plurality of stake accounts 1-$n$. Staking entities (e.g., wallet developers, individuals, etc.) pledge an amount of system specific cryptocurrency (Flexacoin (FXC)) to a stake account for purposes of backing financial transactions of a cryptocurrency wallet's users (i.e., collateral cryptocurrency). Flexacoin is a token on the Ethereum blockchain developed specifically for use within the secure & trusted cryptocurrency acceptance system 10 as a collateral utility token. A more detailed discussion of the stake pool unit 44 and the plurality of stake accounts 1-$n$ is disclosed with reference to FIGS. 6-12.

In order for a cryptocurrency wallet to be recognized by the secure & trusted cryptocurrency acceptance system 10, the cryptocurrency wallet is associated with a stake account of the stake pool unit 44. In this example, the network cryptocurrency wallet 46 is associated with stake account 1. For example, the digital wallet developer of the network cryptocurrency wallet 46 and possibly one or more other staking entities have deposited 1000 units of Flexacoin in stake account 1 to back financial transactions of users of the network cryptocurrency wallet 46.

At step (2b), the cryptocurrency acceptance network computing device 16 places a hold on an amount of Flexacoin in stake account 1. In this example, 100 units of cryptocurrency "aaa" worth of Flexacoin (e.g., an amount of Flexacoin equal to the total amount of cryptocurrency stored in the network cryptocurrency wallet 46) of the 1000 units of amount of Flexacoin in the stake account 1 is placed on hold to back the financial transaction. The 100 units of cryptocurrency "aaa" worth of Flexacoin is referred to as "X" amount of Flexacoin for simplicity.

For example, if cryptocurrency "aaa" and Flexacoin have a one-to-one conversion, "X" equals 100 units and there are now 900 units of Flexacoin available in stake account 1 to back financial transactions of other users of the network cryptocurrency wallet 46. The information pertaining to the hold on "X" amount of Flexacoin of stake account 1 is added to the stake pool smart contract. Transactions within the smart contract include the data required to publish the state of the stake pool transactions to the blockchain. The contract may also include various other information.

The method continues with step (2c), where, when the "X" amount of Flexacoin is placed on hold, the cryptocurrency acceptance network computing device 16 sends the payor computing device 12 a first network acknowledgment (ACK) that the requisite amount of collateral cryptocurrency is on hold and the financial transaction can proceed. If the requisite amount of collateral cryptocurrency cannot be placed on hold (e.g., the stake account does not have enough collateral cryptocurrency available) the cryptocurrency acceptance network computing device 16 sends the payor computing device 12 an error notification and cancels the financial transaction at step (2c).

The method continues with step (3a) where the payor computing device 12 sends the amount of cryptocurrency "aaa" equal to the amount of US dollars requested by the payee computing device 14 to the cryptocurrency acceptance network computing device 16. In this example, the payee computing device 14 is requesting $10. A transaction including information pertaining to transfer of "$10" worth of "aaa" cryptocurrency is added to a block within the "aaa" blockchain. The block includes a header section and a transaction section. The header section includes a block number (e.g., block #1) plus a hash of the previous block (not shown). The header section and/or the transaction section may include various other information.

The transaction information includes the payment amount, the sender cryptocurrency address (the payor computing device 12), and the recipient cryptocurrency address (the cryptocurrency acceptance network computing device 16, not the payee computing device 14). The transaction is then included within a block that is published on the blockchain. However, other details related to the transaction (e.g., the identity of the payee computing device, transaction fees owed by the payee computing device, etc.) are managed privately by the cryptocurrency acceptance network computing device 16 off-chain. Thus, by using the secure & trusted cryptocurrency acceptance system 10, confidential payee related information (e.g., revenue, items being sold, consumer spending behavior, etc.) and confidential payor related information (e.g., consumer identity, items purchased, amount spent at a particular merchant, merchants frequented, etc.) is private (i.e., not published on the blockchain for anyone to see).

Alternatively, or additionally, the payee computing device 14 sends a notice of the financial transaction which includes the amount of desired currency requested (e.g., an amount of US dollars) to the cryptocurrency acceptance network computing device 16 at step (3a+). The method continues with step 3(b) where the cryptocurrency acceptance network computing device 16 sends the payor computing device 12 a network transaction acknowledgement (i.e., a second network acknowledgement (ACK)) that the amount of cryptocurrency received is covered by the amount of collateral cryptocurrency placed on hold. The network transaction acknowledgment of step 3(b) may further include a stored value account (SVA) in an amount equal to or greater than the amount of the transaction generated for the payor computing device 12 to use to complete the transaction with the payee computing device 14.

Alternatively, if the amount of cryptocurrency received is not covered by the amount of collateral cryptocurrency placed on hold, the cryptocurrency acceptance network computing device 16 may cancel the transaction at 3(b) or place a further amount of Flexacoin on hold to cover the transaction at 3(b) depending on the terms of stake account 1.

In this example, the balance of the network cryptocurrency wallet 46 worth of Flexacoin is placed on hold so the payor computing device 12 would not be able to spend more than the amount placed on hold. However, in other examples where the amount of collateral cryptocurrency placed on hold is based on other factors (e.g., merchant ID, typical transaction amounts, etc.), the payor computing device 12 may initiate a transaction for more than what is placed on hold. The terms of the stake account 1 indicate how to proceed in such cases. For example, the stake account 1 may indicate that a user of the network cryptocurrency wallet 46 has a particular spending cap on any individual purchase. Any request that requires a hold on over the spending cap is rejected. However, for a request equal to or lower than the spending cap, additional collateral cryptocurrency is placed on hold so that the transaction can proceed.

The method continues with step 3(c) where the payor computing device 12 sends the payee computing device 14 a notification to finalize the transaction. The notification to finalize the transaction includes the network transaction acknowledgement information from the cryptocurrency acceptance network computing device 16 (e.g., the amount of cryptocurrency has been received and is covered by the amount of collateral cryptocurrency placed on hold) such that the payee computing device 14 can close the financial transaction knowing that the desired funds will arrive or be available by liquidating collateral from the stake pool contract. The notification to finalize the transaction of step 3(c) may further include the SVA in an amount equal to or greater than the amount of the transaction generated for the payor computing device 12 to use to complete the transaction with the payee computing device 14.

As a simplified example summary of FIG. 2A, the payor computing device 12 desires to do a transaction with payee computing device 14 using cryptocurrency "aaa". The payor computing device 12 sends a request to the payee computing device 14 regarding the desired transaction. When the transaction is agreeable to the payee computing device 14, the payee computing device 14 sends an ACK of the transaction.

When the payor and payee computing devices agree to the desired transaction, the payor computing device 12 sends the cryptocurrency acceptance network computing device 16 a request to execute the transaction using the cryptocurrency "aaa". If payor computing device 12 has cryptocurrency "aaa" in its wallet and the cryptocurrency "aaa" is properly staked (e.g., enough to cover the amount in the payor's wallet), then the cryptocurrency acceptance network computing device 16 places a hold on the stake account. With a hold on the stake account, the cryptocurrency acceptance network computing device 16 sends a network ACK to the payor computing device that the payor computing device is authorized to use its cryptocurrency "aaa" with the payee computing device.

Upon receiving the network ACK, the payor computing device 12 notifies the cryptocurrency acceptance network computing device 16 of the amount of the transaction. If the amount of the transaction is less than the amount of cryptocurrency "aaa" that is on hold, the cryptocurrency acceptance network computing device 16 sends an ACK for the specific transaction. The payor and payee computing devices execute the transaction. This process typically takes less than a few seconds to perform.

The method continues on FIG. 2B with step (4a-1) where the cryptocurrency acceptance network computing device 16 seeks a desired number of confirmations of block #1 (e.g., the use of $10 worth of cryptocurrency "aaa" for the transaction) on the "aaa" blockchain 54 via the consensus network 36. The consensus network 36 includes a plurality of consensus devices 1-n. For example, in the Bitcoin blockchain, miners record new transactions into blocks that verify all previous transactions within the blockchain. On average, it takes a miner ten minutes to write a block on the Bitcoin blockchain and the average block time depends on a total hash power of the Bitcoin network.

The desired number of confirmations corresponds to the type of cryptocurrency used. As shown here, the cryptocurrency acceptance network computing device 16 requires "n" confirmations before the transaction on the "aaa" blockchain 54 is considered "final". Receipt of the desired number of confirmations may take minutes to hours of time. However, because every financial transaction is backed with Flexacoin as collateral, the cryptocurrency acceptance network computing device 16 proceeds with the financial transaction and is guaranteed that funds will ultimately be available.

The method continues at step (4a-2) where the cryptocurrency network computing device 16 adjusts the X amount of Flexacoin on hold to equal $10 worth of Flexacoin. $10 worth of Flexacoin is referred to as "y" amount of Flexacoin for simplicity. For example, when the conversion rate between Flexacoin and US dollars is one-to-one, and X is equal to 100, the cryptocurrency acceptance network computing device 16 releases the hold on 90 units of Flexacoin (i.e., "X-y") such that only 10 units of Flexacoin are on hold. The information pertaining to the hold on "X-y" amount of Flexacoin of stake account 1 is added to the stake pool smart contract. Transactions within the smart contract include the data required to publish the state of the stake pool transactions to the blockchain. The contract may also include various other information.

The method continues with step (4a-3) where the desired number of confirmations are received by the cryptocurrency acceptance network computing device 16 from the consensus network 36. The method continues with step (4a-4) where the cryptocurrency acceptance network computing device 16 releases the hold on the "y" amount of Flexacoin of stake account 1. A block including information pertaining to releasing the hold on "y" amount of Flexacoin of stake account 1 is added to the Flexacoin blockchain. For simplicity, the block includes a header section that includes a block number (e.g., block #3) and a transaction section.

Concurrently with seeking desired confirmations in step (4a-2) on FIG. 2B, the method continues with step (4b-1) on FIG. 2C where the cryptocurrency acceptance network computing device 16 sends the $10 worth of cryptocurrency "aaa" sent by the payor computing device 12 to the cryptocurrency exchange device(s) 18. The method continues with step (4b-2) where the cryptocurrency exchange device(s) 18 convert the $10 worth of cryptocurrency "aaa" sent by the payor computing device 12 to $10 of a desired currency (e.g., US dollars). Cryptocurrency exchange is done quickly (e.g., 30 seconds to a few minutes) to account for exchange rate volatility.

The method continues with step (4b-3) where the cryptocurrency exchange device(s) 18 deposit the $10 into a payee banking computing device 56 associated with the payee computing device 14. Alternatively, the cryptocurrency exchange device(s) 18 deposit the $10 into a Flexa banking computing device 55 (e.g., a secure & trusted cryptocurrency acceptance system 10 banking computing device) at step (4b-3+) and the Flexa banking computing device 55 deposits the $10 into a payee banking computing device 56 at step (4b-3). The method continues with step (4b-4) where the payee banking computing device 56 sends a receipt of the deposit of the $10 plus a transaction fee to the cryptocurrency acceptance network computing device 16. The transaction fee is stored in the transaction fee/rewards pool 80 of the stake pool unit 44 for rewards calculation and distribution.

Figure 3:
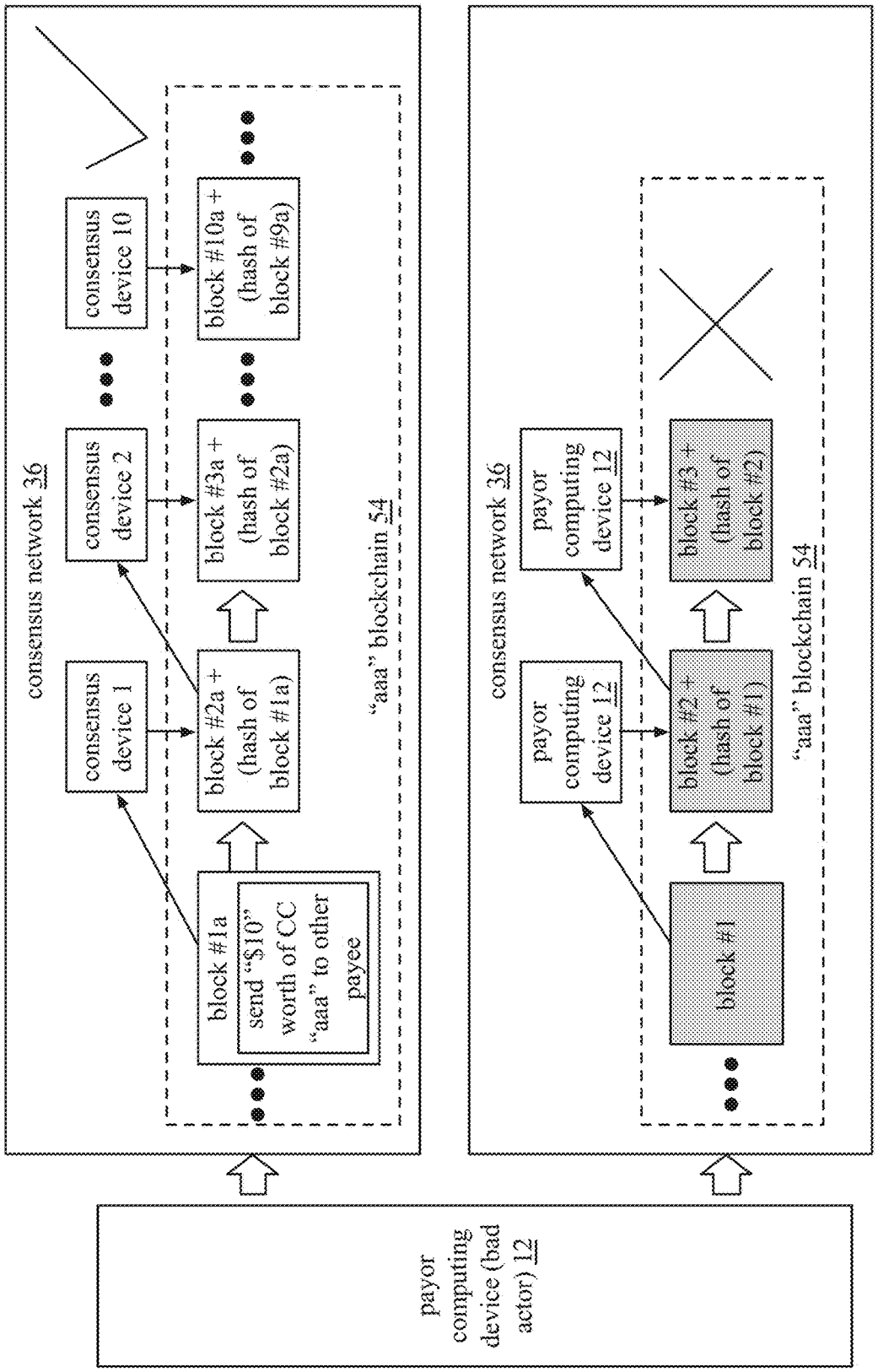
FIG. 3 is a schematic block diagram of an example of an attempted fraudulent transaction within the secure & trusted cryptocurrency acceptance system in accordance with the present invention.

FIG. 3 is a schematic block diagram of an example of an attempted fraudulent transaction within the secure & trusted cryptocurrency acceptance system 10. In this example, the payor computing device 12 is a bad actor attempting to "double spend" on the "aaa" cryptocurrency blockchain 54. Referring to step (3a) of FIG. 2A, where the payor computing device 12 transfers the $10 worth of cryptocurrency "aaa" to the cryptocurrency acceptance network computing device 16 to complete the transaction with the payee computing device 14 (block #1 in gray), in this example, the payor computing 12 simultaneously adds block #1a to the "aaa" cryptocurrency blockchain to send the same $10 worth of cryptocurrency "aaa" to a different payee (e.g., "other payee").

In this example, block #1a is mined by the consensus devices 1-10 of the consensus network 36 and eventually receives 10 confirmations (e.g., enough confirmations to confirm the payment to the different payee). Attempting a 51% attack on a proof-of-work blockchain, the payor computing device 12 attempts to mine block #1 in order to add a longer branch to the "aaa" cryptocurrency blockchain than the block #1a chain. The longest version of the blockchain is considered to be valid by the network consensus rules. Therefore, if payor computing device 12 is successful, the block #1a transaction would receive enough confirmations to be confirmed (e.g., 10 in this example) but then would be abandoned by a self-mined longer branch for block #1 which would also be confirmed.

However, mining blocks takes a significant amount of computing power and after a certain amount of time, the payor computing device 12 cannot keep up with other consensus devices in the consensus network 36. In this example, the payor computing device 12 is able to complete three confirmations of block #1 in the time it takes the other consensus devices to complete ten confirmations of block #1a. Because the block #1a chain is longer, the consensus network 36 adopts it as correct and the shorter chain for block #1 is abandoned.

Figure 4:
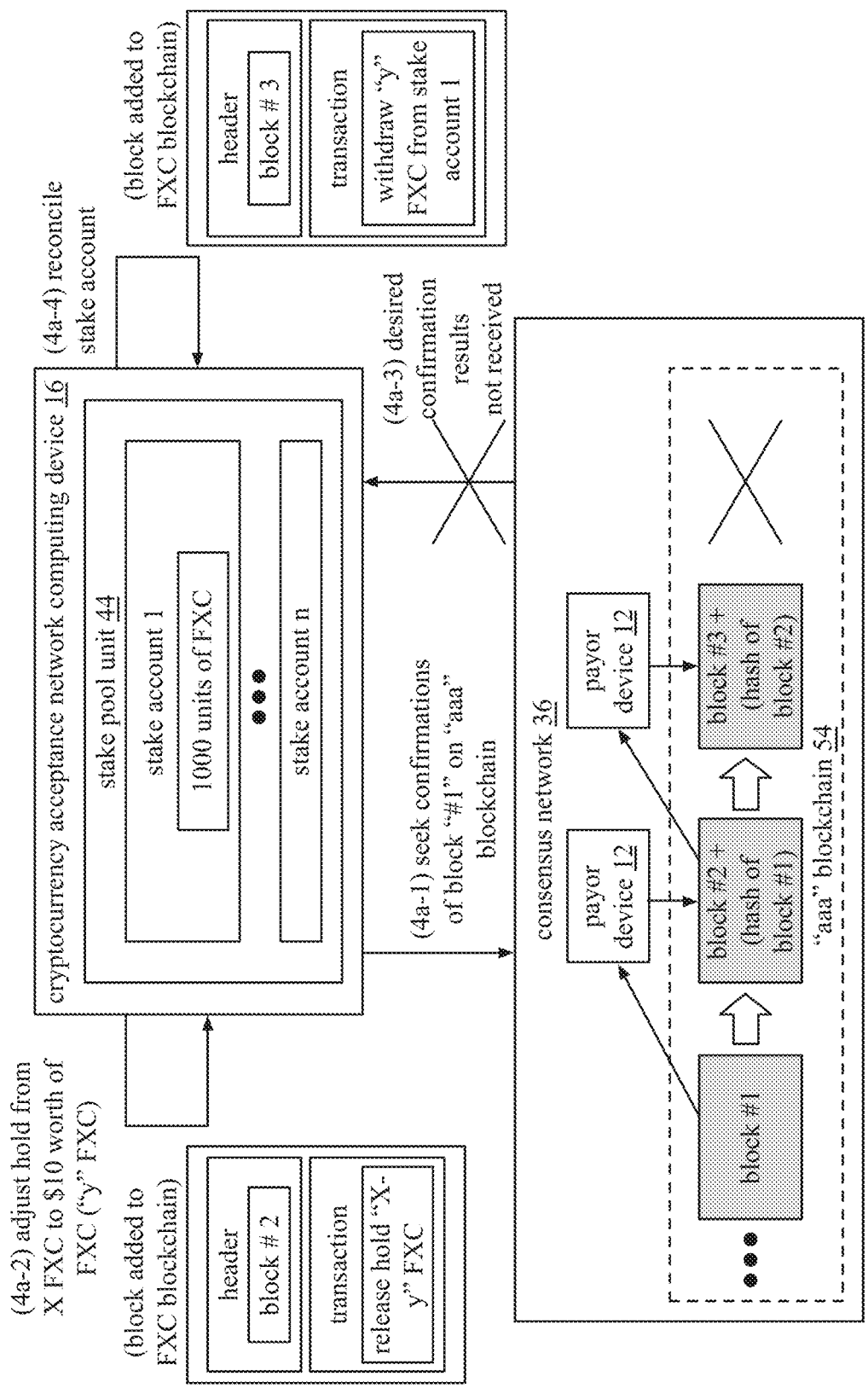
FIG. 4 is a flowchart of an example of attempted network attack within the secure & trusted cryptocurrency acceptance system in accordance with the present invention.

FIG. 4 is a flowchart of an example of an attempted network attack within the secure & trusted cryptocurrency acceptance system 10. As described in the example of FIG. 3, the payor computing device 12 attempts to double spend the $10 worth of cryptocurrency "aaa" on the cryptocurrency "aaa" blockchain 54. The payor computing device 12's attempt to double spend is considered a network attack. The smaller branch for block #1 is eventually abandoned by the "aaa" blockchain 54. As such, the cryptocurrency acceptance network computing device 16 does not receive the desired amount of confirmation results at step (4a-3) with reference to the method of FIGS. 2A-2C.

The concurrent steps of (4b-1) through (4b-4) of FIG. 2C remain unchanged. However, the method continues with an alternative step (4a-4) where the cryptocurrency acceptance network computing device 16 withdraws the "y" amount of Flexacoin from stake account 1. The information pertaining to the withdrawal of "y" amount of Flexacoin of stake account 1 is added to the stake pool smart contract and then published to the blockchain. The contract may also include various other information.

Figure 5A:
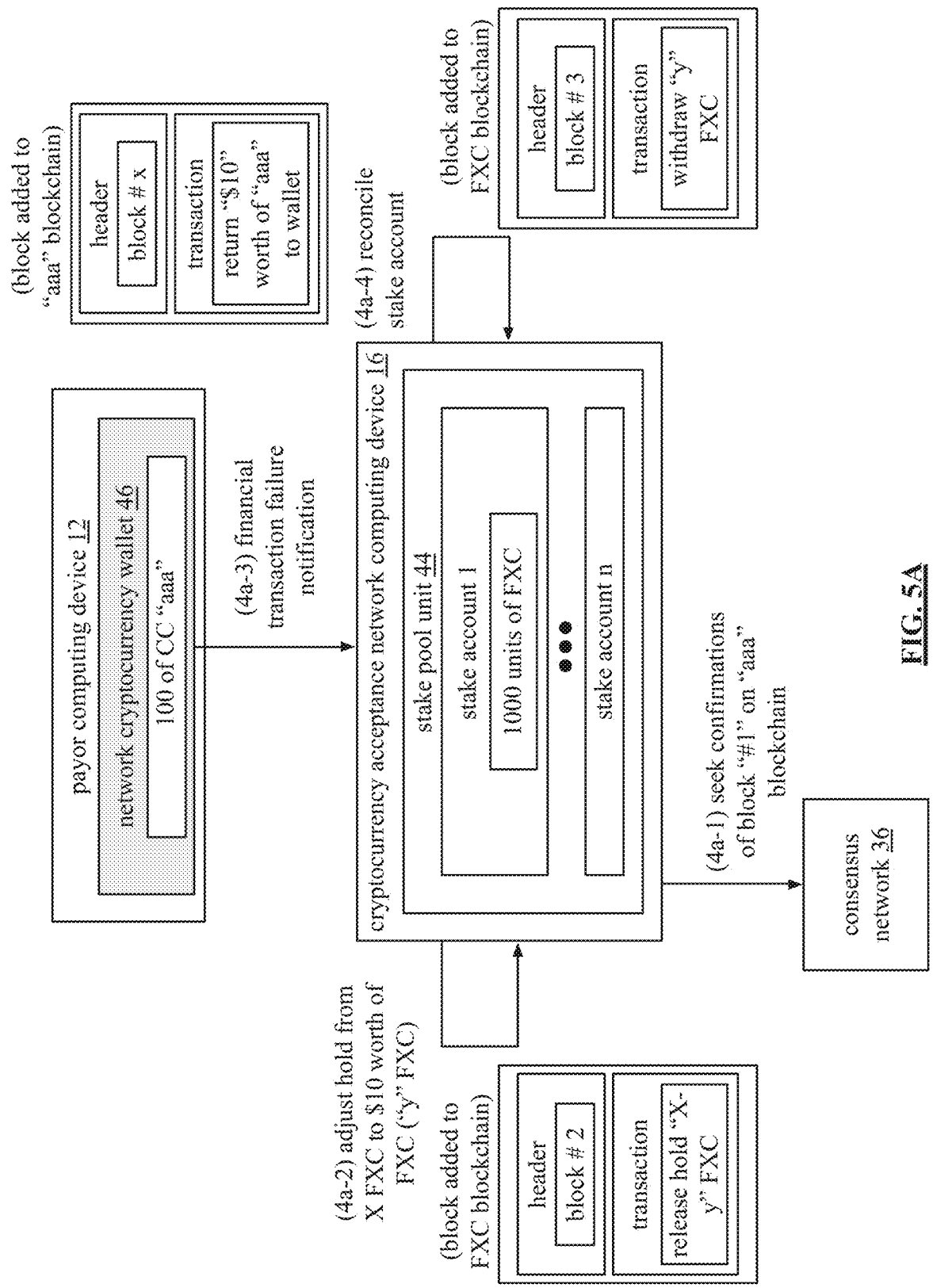
FIGS. 5A-5B are flowcharts of an example of a wallet authorization failure within the secure & trusted cryptocurrency acceptance system in accordance with the present invention.
Figure 5B:
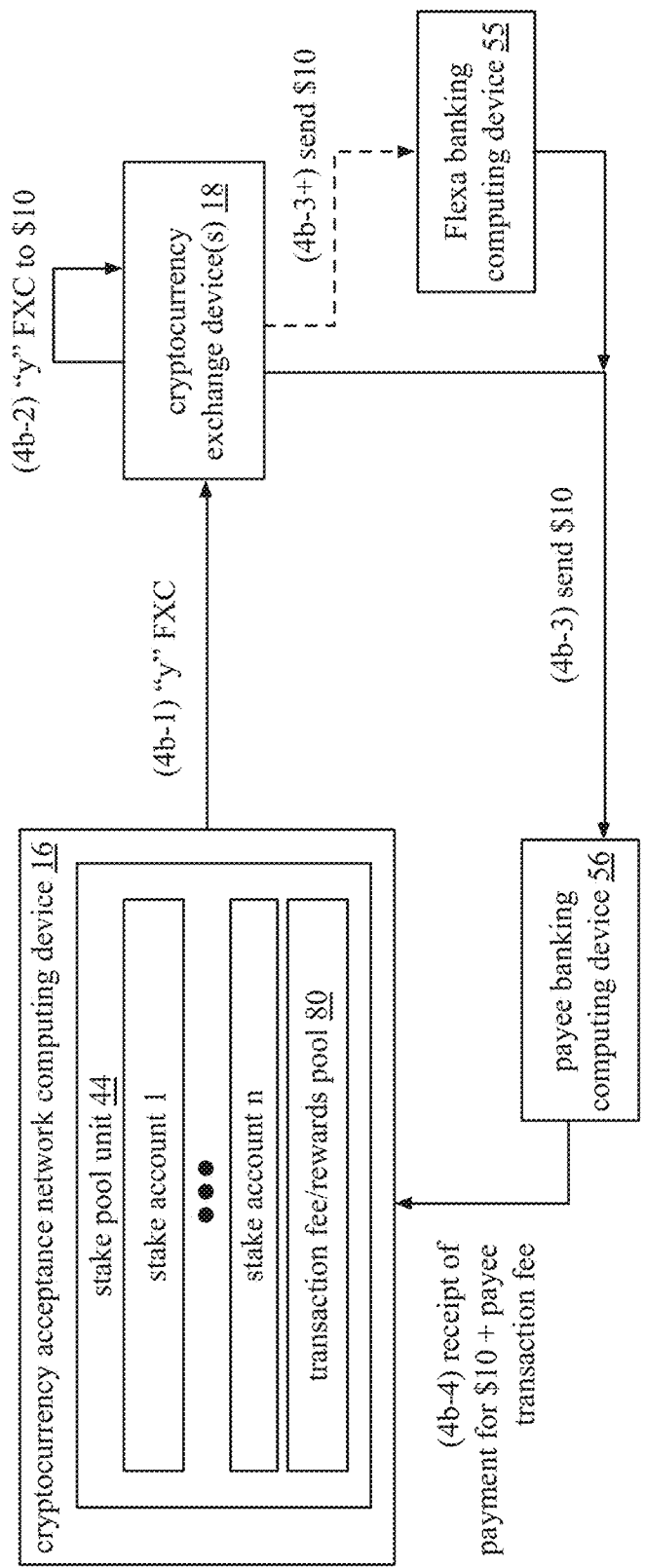

FIGS. 5A-5B are flowcharts of an example of a wallet authorization failure within the secure & trusted cryptocurrency acceptance system 10. Referring to the method of FIGS. 2A-2D, at some time after step (4a-2) and prior to receiving the desired amount of confirmations at step (4a-3), in FIG. 5A, the cryptocurrency acceptance network computing device 16 receives a financial transaction failure notification at alternative step (4a-3). For example, the transaction was erroneously authorized via fraud or software malfunction of the network cryptocurrency wallet 46.

With the error discovered, the network cryptocurrency wallet 46 sends the financial transaction failure notification and seeks a return of funds. A transaction including information pertaining to return of "$10" worth of "aaa" cryptocurrency to wallet is added to the "aaa" blockchain. For simplicity, the block includes a header section that includes a block number (e.g., block #x) and a transaction section.

The method of FIG. 5A continues with an alternative step (4a-4) where the cryptocurrency acceptance network computing device 16 withdraws the "y" amount of Flexacoin from stake account 1. A transaction including information pertaining to withdrawing the "y" amount of Flexacoin from stake account 1 is published to the blockchain. For simplicity, the block includes a header section that includes a block number (e.g., block #3) and a transaction section.

FIG. 5B operates similarly to FIG. 2C except that the method continues with an alternative step of (4b-1) where the cryptocurrency acceptance network computing device 16 sends the "y" FXC to the cryptocurrency exchange device(s) 18. The method continues with alternative step (4b-2) where the cryptocurrency exchange device(s) 18 convert the "y" FXC to $10. The method continues with step (4b-3) where the cryptocurrency exchange device(s) 18 deposit the $10 into a payee banking computing device 56 associated with the payee computing device 14.

Alternatively, the cryptocurrency exchange device(s) 18 deposit the $10 into a Flexa banking computing device 55 (e.g., a secure & trusted cryptocurrency acceptance system 10 banking computing device) at step (4b-3+) and the Flexa banking computing device 55 deposits the $10 into a payee banking computing device 56 at step (4b-3). The method continues with step (4b-4) where the payee banking computing device 56 sends a receipt of the deposit of the $10 plus a transaction fee to the cryptocurrency acceptance network computing device 16. The transaction fee is stored in the transaction fee/rewards pool 80 of the stake pool unit 44 for rewards calculation, conversion into Flexacoin, and distribution.

Figure 6:
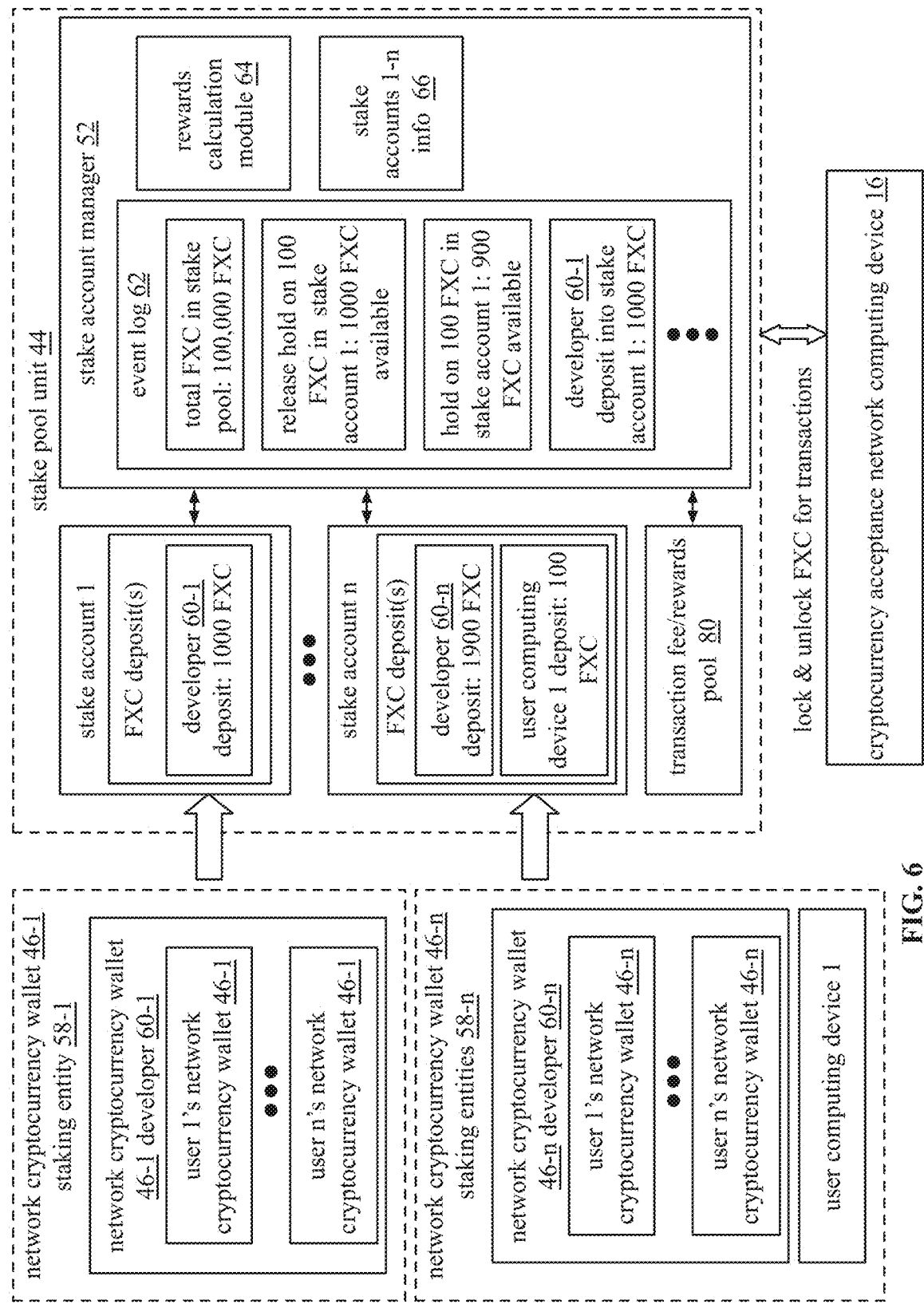
FIG. 6 is a schematic block diagram of an embodiment of a stake pool of the secure & trusted cryptocurrency acceptance system in accordance with the present invention.

FIG. 6 is a schematic block diagram of an embodiment of a stake pool unit 44 of the secure & trusted cryptocurrency acceptance system 10. The stake pool unit 44 stores a plurality of stake accounts 1-n, includes a stake account manager 52, and stores a transaction fee/rewards pool 80. The plurality of stake accounts 1-n store collateral cryptocurrency to secure transactions within the secure & trusted cryptocurrency acceptance system 10. For example, Flexacoin (FXC) is a token on the Ethereum blockchain created for use as a system specific cryptocurrency within the secure & trusted cryptocurrency acceptance system 10 and is usable as collateral cryptocurrency. In order to be recognized by the secure & trusted cryptocurrency acceptance system 10, a cryptocurrency wallet must be associated with a stake account that is backed with Flexacoin. An entity that pledges Flexacoin to a stake account is referred to as a staking entity.

For example, a digital wallet developer creates an account with the cryptocurrency acceptance network computing device 16 in order for its wallet users to be a part of the secure & trusted cryptocurrency acceptance system 10. As part of the account set up, the digital wallet developer must acquire a certain amount of collateral cryptocurrency into a stake account for purposes of backing the financial transactions of its wallet users.

For example, the network cryptocurrency wallet 46-1 developer 60-1 has developed the network cryptocurrency wallet 46-1 for use by a plurality of users 1-n. The network cryptocurrency wallet 46-1 developer 60-1 sets up an account with the cryptocurrency acceptance network computing device 16 which includes establishing stake account 1 for purposes of backing the transactions of users of the network cryptocurrency wallet 46-1 (i.e., user 1-n's network cryptocurrency wallets 46-1). In this example, the network cryptocurrency wallet 46-1 developer 60-1 purchases and deposits 1000 units of Flexacoin into stake account 1. Thus, the network cryptocurrency wallet 46-1 developer 60-1 is the network cryptocurrency wallet 46-1 staking entity 58-1.

As another example, a network cryptocurrency wallet 46-n developer 60-n has developed the network cryptocurrency wallet 46-n for use by a plurality of users 1-n. The network cryptocurrency wallet 46-n developer 60-n sets up an account with the cryptocurrency acceptance network computing device 16 which includes establishing stake account n for purposes of backing the transactions of users of the network cryptocurrency wallet 46-n (i.e., users 1-n's network cryptocurrency wallets 46-n). In this example, the network cryptocurrency wallet 46-n developer 60-n purchases and deposits 1900 units of Flexacoin into stake account n. Additionally, an individual (e.g., a user computing device 1) purchases and deposits 100 units of Flexacoin into stake account n. Thus, the network cryptocurrency wallet 46-n developer 60-n and user computing device 1 are the network cryptocurrency wallet 46-n staking entities 58-n.

The amount of Flexacoin purchased by a cryptocurrency wallet developer for backing cryptocurrency wallet transactions is based on the amount of users of its cryptocurrency wallet, the amount of anticipated spending by those users, projections of growth, etc. A cryptocurrency wallet should be "over-collateralized" so that its users can spend freely.

In exchange for pledging Flexacoin, staking entities are provided rewards such as a percentage back on successful transactions completed by their wallet's users. Because of the incentives provided, a variety of staking entities (e.g., individual user computing devices, other wallet developers) may wish to pledge collateral cryptocurrency into one or more stake accounts.

The stake account manager 52 manages the plurality of stake accounts 1-n and includes an event log 62, a rewards calculation module 64, and stake accounts 1-n information 66 ("info"). The plurality of stake accounts 1-n are "on-chain" smart contracts such as smart contracts on the Ethereum blockchain (i.e., they are visible to everyone) but the stake account manager 52 stores information and conducts activities "off-chain." For example, the stake manager 52 maintains an event log 62 of stake pool activities which includes tracking the total amount of Flexacoin serving as collateral cryptocurrency in the stake pool unit 44 at a given time. In this example, 100,000 units of Flexacoin are serving as collateral cryptocurrency (i.e., FXC pledged to stake accounts 1-n) in the stake pool unit 44. This entry is featured at the top of the event log 62.

The event log 62 further includes entries for stake pool activities such as deposits, withdrawals, holds, etc. In this example, starting with older entries toward the bottom, the event log 62 includes an entry for the network cryptocurrency wallet 46-1 developer 60-1 depositing 1000 FXC into stake account 1. Next, the event log 62 shows that there was a hold placed on 100 units of FXC in stake account 1 leaving 900 units of FXC available for backing network cryptocurrency wallet 46-1 transactions. The most recent entry in the event log 62 states that the hold was released on the 100 units of FXC in stake account 1.

The stake accounts 1-n information 66 stores information pertaining to the stake accounts 1-n such as how much FXC is available for backing transactions associated with each stake account at a particular time. The stake accounts 1-n information 66 further includes rewards percentages per successful transaction, terms of rewards withdrawals, transaction fee rates, etc. For example, payee computing devices may pay different transaction fees for successful transactions completed by different network cryptocurrency wallets. Further, different stake accounts may have different rewards rates and rewards withdrawal preferences.

While these are all contracted terms established by setting up a stake account and/or the payee computing device 14 accounts with the cryptocurrency acceptance network computing device 16, it is important to keep these terms confidential. For example, if published, payees (e.g., merchants) would be made aware of what every payee's transaction fee is, thus eliminating the secure & trusted cryptocurrency acceptance system 10's ability to contract on different terms. For example, well established merchants may be provided a lower transaction fee as an incentive to join the secure & trusted cryptocurrency acceptance system 10's. If that information is public, all payees would demand the same low transaction fee.

Further, staking entities for one stake account may be provided a different rewards percentage compared to staking entities for another stake account. For example, staking entities of a stake account for a highly reliable and widely used network cryptocurrency wallet may be provided a higher rewards percentage than staking entities of a stake account for a brand new network cryptocurrency wallet with less users. To allow for varying terms, confidential contract terms such as the above examples are stored privately (i.e., not published on the blockchain smart contract) in the stake account manager 52.

The rewards calculation module 64 calculates the rewards owed to the staking entities at a given time by accessing the stake accounts 1-n information 66, the transaction fee/rewards pool 80, and the event log 62. For example, the stake accounts 1-n information 66 includes terms for rewards withdrawals. Stake accounts 1-n terms for rewards withdrawals may include one or more of: times of rewards withdrawals (e.g., automated (e.g., once a week), manual, etc.), whether the rewards withdrawals can be on-chain or off-chain, identification of those authorized to initiate a rewards withdrawal, etc. The rewards calculation module 64 is discussed in more detail with reference to FIGS. 8-12.

Figure 7:
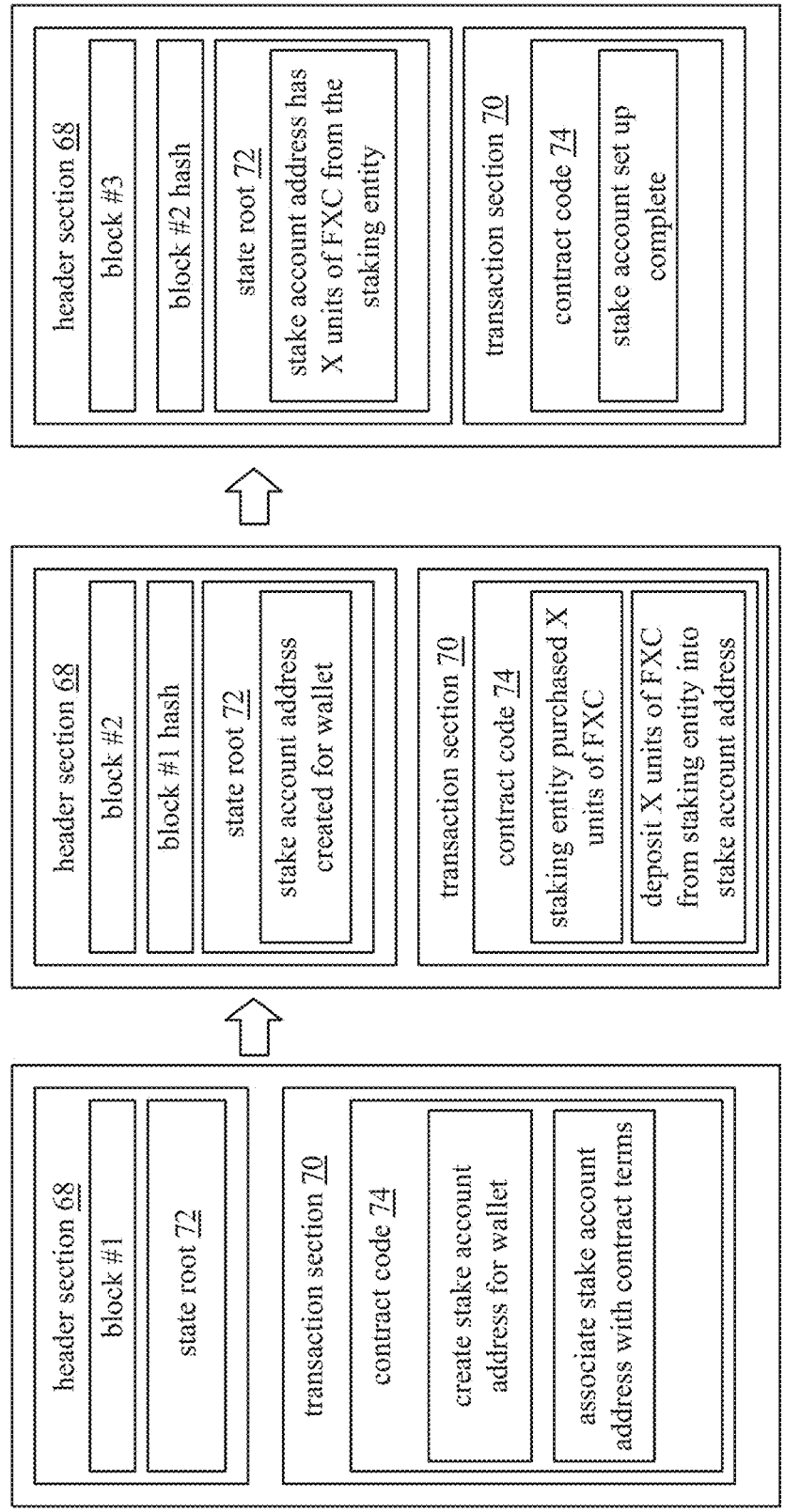
FIG. 7 is a schematic block diagram of an embodiment of a stake account setup in accordance with the present invention.

FIG. 7 is a schematic block diagram of an embodiment of a stake account setup. A stake account is a blockchain smart contract such as a smart contract on the Ethereum blockchain. A smart contract is computer code written to a blockchain or similar database implementation, and executable by network users. When an event outlined in the contract is triggered, the code executes. Therefore, a smart contract runs exactly as programmed without any possibility of censorship, downtime, fraud, or third party interference.

For example, the Ethereum blockchain is a distributed blockchain network that is able to run programming code of any decentralized application through the use of Turing complete software. An Ethereum block includes a header section 68 and a transaction section 70. The structure of the Ethereum blockchain is similar to the structure of other traditional blockchains such as Bitcoin in that it is a shared record of the entire transaction history. However, an Ethereum block stores not only transactions that have been collected since the last block in the blockchain was mined (like in Bitcoin) but also the recent "state" of each smart contract. A consensus network (i.e., a network of miners) is responsible for shifting the smart contract from state to state. The header section 68 includes these states in a root hash value (i.e., the state root 72) which summarizes the state changes. The header section 68 further includes other identifying information such as a block number and a hash of a previous block.

The transaction section 70 in Ethereum includes a nonce (a unique transaction identifier), an address of a recipient account, a value, a sending account's signature, code to be run (e.g., contract code 74), mining related fields (e.g., start gas and gas price), and possibly some data (e.g., input values for the code). Here, the transaction section 70 is shown as including the contract code 74 for simplicity.

When a cryptocurrency wallet developer wishes to have a cryptocurrency wallet associated with the secure & trusted cryptocurrency acceptance system 10, the cryptocurrency wallet developer sets up an account with the cryptocurrency acceptance network computing device 16. The account set-up includes establishing a stake account for the cryptocurrency wallet. To establish the stake account, a smart contract is written on the Ethereum blockchain beginning with block #1 of FIG. 7.

For simplicity, the stake account creation begins with block #1 although numerous blocks would proceed this block. The header section 68 of block #1 includes a state root 72 which includes a current summary of the states of the accounts of the system. Here, state root 72 is empty for simplicity. The transaction section 70 of block #1 includes contract code 74 which includes code for creating a stake account address for the cryptocurrency wallet and associating the stake account address with contract terms set by the staking entity and the cryptocurrency acceptance network computing device 16.

The header section 68 of block #2 includes a hash of block #1 and a state root 72. The state root 72 includes information pertaining to the current state of the stake account. For example, the state root 72 of block #2 states that the stake account was created for the cryptocurrency wallet (e.g., as block #1 is mined, the contract code 74 of block #1 runs). The transaction section 70 of block #2 includes contract code 74 which includes instructions for making a deposit into the stake account address in accordance with the contract terms. For example, the contract code 74 states that an address owned by the staking entity is in possession of X units of Flexacoin (FXC) to deposit into the stake account address.

The header section 68 of block #3 includes a hash of block #2 and a state root 72. The state root 72 includes information pertaining to the current state of the stake account. For example, the state root 72 of block #3 states that the stake account has X units of FXC deposited by the staking entity. The transaction section 70 of block #3 includes contract code 74 which indicates that the stake account set up is complete.

Figure 8:
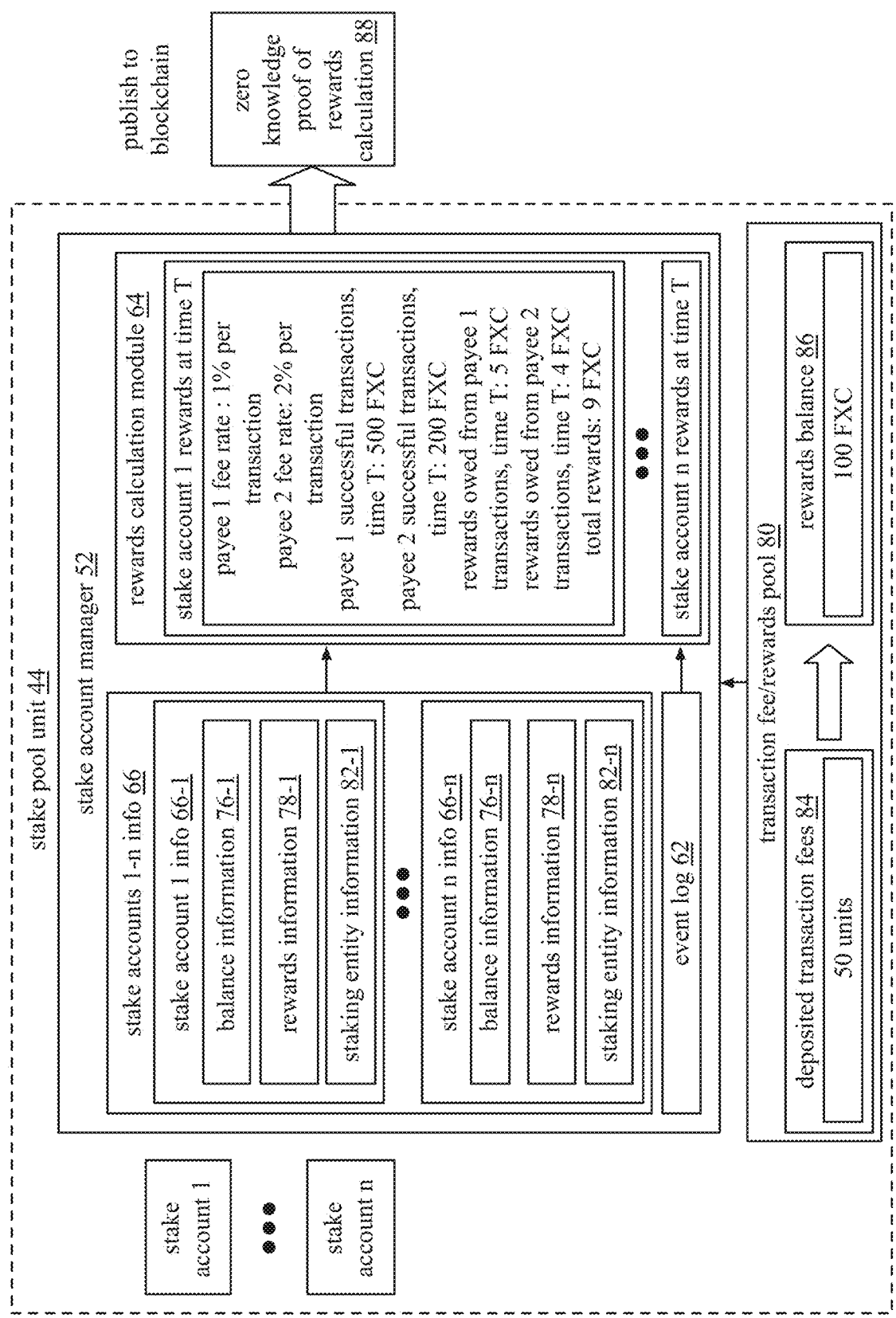
FIG. 8 is a schematic block diagram of an embodiment of a stake pool of the secure & trusted cryptocurrency acceptance system in accordance with the present invention.

FIG. 8 is a schematic block diagram of an embodiment of a stake pool unit 44 of the secure & trusted cryptocurrency acceptance system 10. The stake pool unit 44 stores a plurality of stake accounts 1-$n$, includes a stake account manager 52, and stores a transaction fee/rewards pool 80. The stake account manager 52 stores stake accounts 1-$n$ information 66 and event log 62 "off-chain." The stake account manager 52 includes a rewards calculation module 64 that is operable to calculate rewards owed to stake accounts 1-$n$ and the staking entities associated with the stake accounts using the privately stored information.

The stake accounts 1-$n$ information 66 store balance information 76-1 through 76-$n$ with includes how much Flexacoin (FXC) is available for backing transactions, how much FXC is locked due to pending transactions, and how much FXC has been deposited as rewards.

The stake accounts 1-$n$ information 66 further store rewards information 78-1 through 78-$n$ which includes rewards percentages per successful transaction, terms of rewards withdrawals, transaction fee rates, staking entity rewards percentages, information pertaining to the successful transactions that have occurred per payee at a given time (e.g., T), etc. For example, payees may pay different transaction fees for successful transactions completed by different network cryptocurrency wallets. Further, different payees may pay different transaction fees to the same network cryptocurrency wallets. Rewards information 78-1 through 78-$n$ also includes rewards deposit preferences. Rewards deposit preferences may include one or more of: times of rewards deposits (e.g., automated (e.g., once a week), manual, etc.), one or more triggering events that initiate a rewards deposit, staking entity rewards percentages, etc.

The stake accounts 1-$n$ information 66 further stores staking entity information 82-1 through 82-$n$ such as identities of staking entities associated with the stake account, staking entity permissions, staking entity FXC withdrawal information (e.g., whether a withdrawal can be on-chain or off-chain, identification of those authorized to initiate a withdrawal, etc.), etc.

The transaction fee/rewards pool 80 includes deposited transaction fees 84 paid by payees with every successful transaction. In the example shown, there is currently 50 units of deposited transaction fees 84 in the transaction fee/rewards pool 80. The incoming transaction fees 84 are pooled and used to purchase FXC to distribute as rewards 86. In the example shown, the rewards balance 86 is 100 FXC. For example, the deposited transaction fees 84 balance was previously higher, but a portion was used to purchase 100 units of FXC. Deposited transaction fees 84 may be converted to FXC for rewards based on a predetermined time (e.g., hourly) and/or a triggering event such as obtaining a certain amount of deposited transaction fees 84, a particular rewards balance 86 is reached, a rewards distribution is requested, etc. Rewards are pooled in rewards balance 86 until a distribution of rewards occurs.

The rewards calculation module 64 determines to distribute rewards to the stake accounts 1-$n$ based on one or more of: a predetermined time (i.e., daily, weekly, etc.), a request by a staking entity (e.g., through a stake account withdrawal request), and/or a triggering event. A triggering event includes one or more of: completion of a certain amount of successful transactions, reaching a certain amount of incoming transaction fees, reaching a certain rewards balance 86, a staking entity contract term, etc. When the rewards calculation module 64 determines to distribute rewards, the rewards calculation module 64 accesses the stake accounts 1-*n* information 66, the transaction fee/rewards pool 80, and the event log 62 to calculate the reward amount owed to each stake account.

In an example of operation, the rewards calculation module 64 determines to distribute rewards and calculates the rewards owed to stake account 1 at time T. The rewards calculation module 64 accesses one or more of the stake account 1 information 66-1 and the event log to determine that at time T, stake account 1 has backed transactions with payee 1 and payee 2. As per stake account 1's rewards information 76-1, payee 1 has a 1% per successful transaction fee rate for successful transactions with stake account 1's network cryptocurrency wallet and payee 2 has a 2% per successful transaction fee rate for successful transactions with stake account 1's network cryptocurrency wallet.

Further, from the rewards information 78-1, the rewards calculation module 64 determines that payee 1 has completed 500 units worth of successful transactions with stake account 1's network cryptocurrency wallet and payee 2 has completed 200 units worth of successful transactions with stake account 1's network cryptocurrency wallet. The rewards calculation module 64 calculates that stake account 1 is owed 5 units of FXC rewards based on payee 1 transactions and 4 units of FXC rewards based on payee 2 transactions. Therefore, from the 100 units of FXC rewards available in the rewards balance 86, stake account 1 is owed 9 units of FXC.

The rewards calculation module 64 performs a batched and secure calculation technique on the calculated reward amounts to produce a batched and secure rewards distribution summary. The batched and secure rewards distribution summary ensures that each reward amount is calculated correctly without disclosing the privately stored stake account information.

For example, the rewards calculations for one or more stake accounts are batched and compressed using a zero knowledge proof calculation. A zero knowledge proof calculation allows for recipients of the proof to verify that a portion is correct without knowing the details of the input calculation. The zero knowledge proof of rewards calculation 88 is used to deposit rewards into stake accounts on a public blockchain (e.g., into smart contracts on the Ethereum blockchain) without publishing confidential details such as payee transaction fee rates, amount of successful transactions, etc.

Figure 9:
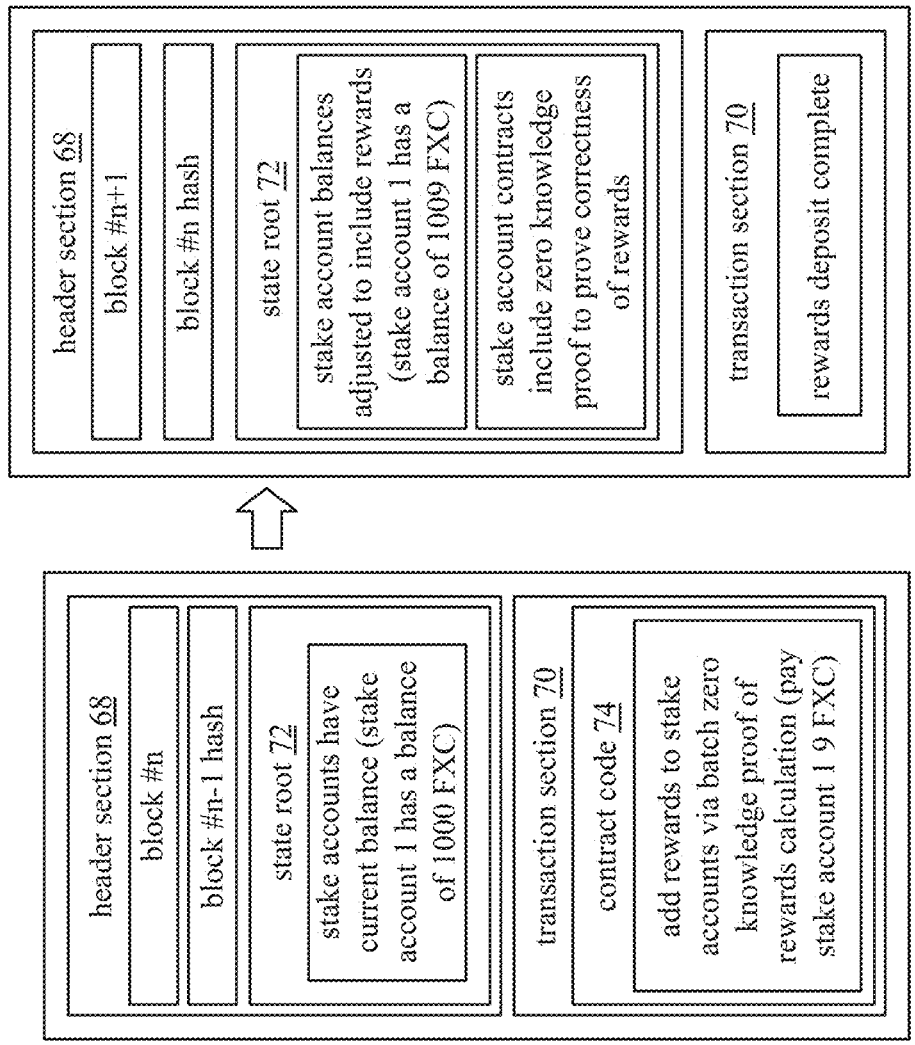
FIG. 9 is a schematic block diagram of an example of a rewards distribution to one or more stake accounts in accordance with the present invention.

FIG. 9 is a schematic block diagram of an example of a rewards distribution to one or more stake accounts. A stake account is a blockchain smart contract such as a smart contract on the Ethereum blockchain. An Ethereum block includes a header section 68 and a transaction section 70. The header section 68 includes these states in a root hash value (i.e., the state root 72) which summarizes the state changes of smart contracts. The header section 68 further includes other identifying information such as a block number and a hash of a previous block.

The transaction section 70 in Ethereum includes a nonce (a unique transaction identifier), an address of a recipient account, a value, a sending account's signature, code to be run (e.g., contract code 74), mining related fields (e.g., start gas and gas price), and possibly some data (e.g., input values for the code). Here, the transaction section 70 is shown as including the contract code 74 for simplicity.

When is it time to distribute rewards into one or more stake accounts (e.g., at a predetermined time (i.e., daily, weekly, etc.), a time based on a certain amount of transactions, a time based on a certain amount of incoming transaction fees, and/or a time based on a request by a staking entity (e.g., through a stake account withdrawal request)) the stake account manager calculates rewards owed and uses a zero knowledge proof of the rewards calculation to deposit rewards to the one or more stake accounts.

The rewards deposit begins with block #n. The header section 68 of block #n includes a hash of block #n−1 and a state root 72 which includes a current summary of the states of the accounts of the system. For example, the summary includes current balances of stake accounts of the system. As a specific example, the summary may include that stake account 1 has a balance of 1000 FXC. The transaction section 70 of block #n includes contract code 74 which includes code for adding the rewards to the one or more stake accounts via a batched zero knowledge proof of rewards calculation. For example, the batched zero knowledge proof of rewards calculation includes code to deposit 9 FXC into stake account 1 (using the example of FIG. 8) as well as the proof itself to prove that the rewards are correct.

The header section 68 of block #n+1 includes a hash of block #n and a state root 72. The state root 72 includes information pertaining to the current states of the one or more stake account. For example, the state root 72 of block #n+1 states that the stake account balances were adjusted to include rewards (e.g., stake account 1 now has a balance of 1009 FXC) and that the stake account include the zero knowledge proof of rewards calculation to prove the rewards were calculated correctly. The transaction section 70 of block #n+1 includes contract code 74 which indicates that the rewards deposits are complete.

Figure 10:
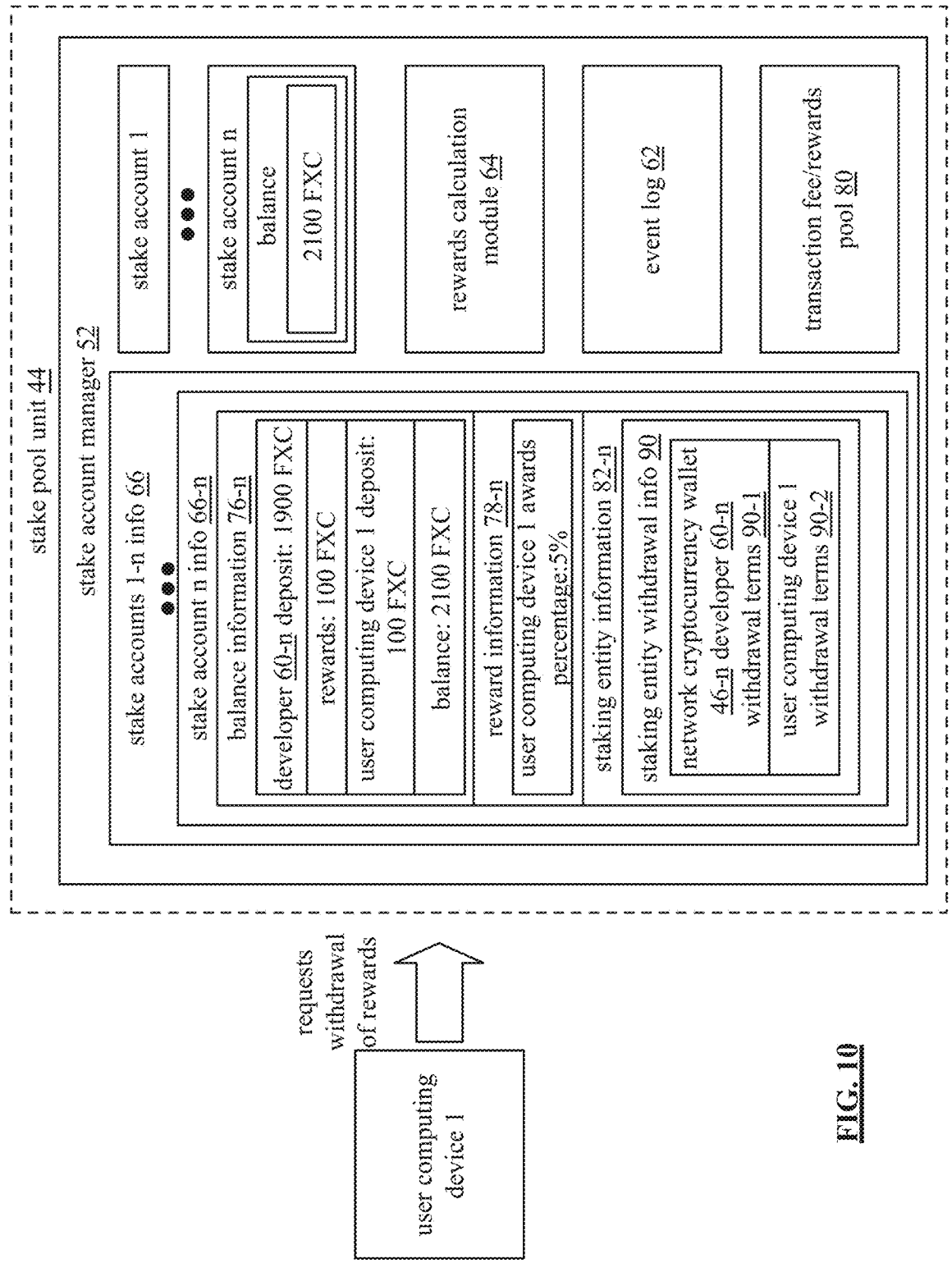
FIG. 10 is a schematic block diagram of an embodiment of the stake pool of the secure & trusted cryptocurrency acceptance system in accordance with the present invention.

FIG. 10 is a schematic block diagram of an embodiment of the stake pool unit 44 of the secure & trusted cryptocurrency acceptance system 10. The stake pool unit 44 stores a plurality of stake accounts 1-*n*, includes a stake account manager 52, and stores a transaction fee/rewards pool 80. The stake account manager 52 includes stake accounts 1-*n* information 66, rewards calculation module 64, and event log 62. (e.g., "off-chain"). The stake account manager 52 includes a rewards calculation module 64 that is operable to calculate rewards owed to stake accounts 1-*n* and the staking entities associated with the stake accounts using the information stored off-chain.

The stake accounts 1-*n* information 66 store balance information 76-1 through 76-*n* with includes how much Flexacoin (FXC) is available for backing transactions, how much FXC is locked due to pending transactions, and FXC deposited as rewards. The stake accounts 1-*n* information 66 further store rewards information 78-1 through 78-*n* which includes rewards percentages per successful transaction, terms of rewards withdrawals, transaction fee rates, staking entity rewards percentage, information pertaining to the successful transactions that have occurred per payee at a given time (e.g., T), etc. For example, payees may pay different transaction fees for successful transactions completed by different network cryptocurrency wallets. Further, different payees may pay different transaction fees to the same network cryptocurrency wallets.

Rewards information 78-1 through 78-*n* also includes rewards deposit preferences. Rewards deposit preferences may include one or more of: times of rewards deposits (e.g., automated (e.g., once a week), manual, etc.), one or more triggering events that initiate a rewards deposit, staking entity rewards percentages, etc. The stake accounts 1-*n* information 66 further stores staking entity information 82-1 through 82-n such as identities of staking entities associated with the stake account, staking entity permissions, staking entity withdrawal information 90 (e.g., whether a withdrawal can be on-chain or off-chain, identification of those authorized to initiate a withdrawal, etc.), etc.

The transaction fee/rewards pool 80 includes deposited transaction fees 84 paid by payees with every successful transaction. In the example shown, there is currently 50 units of deposited transaction fees 84 in the transaction fee/rewards pool 80. The incoming transaction fees 84 are pooled and used to purchase FXC to distribute as rewards 86. In the example shown, the rewards balance 86 is 100 FXC. For example, the deposited transaction fees 84 balance was previously higher, but a portion was used to purchase 100 units of FXC. Deposited transaction fees 84 may be converted to FXC for rewards based on a predetermined time (e.g., hourly) and/or a triggering event such as obtaining a certain amount of deposited transaction fees 84, a particular rewards balance 86 is reached, a rewards distribution is requested, etc. Rewards are pooled in rewards balance 86 until a distribution of rewards occurs.

As an example, the user computing device 1 requests a withdrawal of rewards owed. With reference to the example of FIG. 6, stake account n is associated with two staking entities: the network cryptocurrency wallet 46-n developer 60-n and the user computing device 1. Therefore, in this example, stake account n information is shown. User computing device 1's withdrawal request may trigger a rewards distribution to the stake account n. In this example, rewards have already been distributed to the stake account n and the user computing device 1 requests a withdrawal for a portion of those deposited rewards. The distribution of rewards to the stake account n may include calculating a staking entity's portion and where that information is distributed within the zero knowledge proof calculation with the rewards deposit. In another embodiment, the stake account manager 52 calculates the percentage of rewards owed to a staking entity upon a withdrawal request.

In response to user computing device 1's withdrawal request, the stake account manager 52 accesses the user computing device withdrawal terms 90-2 of stake account n's staking entity information 82-n. The staking entity withdrawal information includes one or more of: whether a withdrawal can be on-chain or off-chain, how much can be withdrawn, times of withdrawal, and a type of FXC withdrawal (e.g., rewards, stake, etc.). The request from the user computing device 1 may specify a particular amount or request a withdrawal of total rewards owed. The request may be to withdraw or to send the amount to another address/account.

If the withdrawal request is within the terms of the user computing device 1 withdrawal terms 90-2, the stake account manager 52 proceeds with the request by accessing the balance information 76-n and the reward information 78-n to calculate the percentage of rewards owed to the user computing device 1. Alternatively, the stake account manager 52 previously calculated the percentage of rewards owed to the user computing device 1 during the rewards distribution to stake account n. In that situation, the stake account manager 52 would deposit the rewards according to that calculation.

When the stake account manager 52 has not previously calculated the percentage of rewards owed to the user computing device 1 during the rewards distribution to stake account n, the stake account manager 52 calculates the percentage owed upon the approval of the request. The stake account manager 52 accesses the balance information 76-n to determine that stake account 1 currently stores 2100 units of FXC, where 1900 units of the 2100 FXC were pledged by the network cryptocurrency wallet 46-n developer 60-n, 100 units of FXC were pledged by the user computing device 1, and 100 units of FXC have been deposited into stake account n as rewards.

The stake account manager 52 further accesses the rewards information 78-n to determine that the user computing device 1 awards percentage is 5% of all stake account rewards. The user computing device 1's awards percentage is a contracted term based on the amount of FXC pledged to the stake account n. For example, in exchange for depositing 100 FXC in stake account n, the user computing device 1 is offered 5% of stake account rewards in return. Based on the user computing device 1 awards percentage of 5%, the stake account manager 52 determines that the rewards owed are 5 FXC (e.g., 5% of 100 FXC rewards).

If the withdrawal is authorized as on-chain, the stake account manager 52 publishes the 5 FXC rewards withdrawal made by the user computing device 1's account to the blockchain. If the withdrawal is authorized as off-chain, the stake account n balance is updated on-chain with the details of the withdrawal private. For example, the 5 units of FXC is withdrawn from stake account n (on-chain), sent to an internal account not associated with the user computing device 1 (on-chain), converted to US dollars (or other fiat currency), and transferred to a banking account associated with the user computing device 1 (off-chain).

As another example, the user computing device 1 requests a withdrawal of a specific amount (e.g., 115 FXC). The stake account manager 52 accesses the user computing device withdrawal terms 90-2 to determine whether the user computing device 1 is authorized to make a withdrawal, whether the time of withdrawal is appropriate, and whether the withdrawal can be "on-chain." If the withdrawal request is within the terms of the user computing device withdrawal terms 90-2, the stake account manager 52 proceeds with the request by accessing the user computing device 1 awards percentage (e.g., 5%) from reward information 78-n and the balance information 76-n to determine the reward balance (e.g., 100 FXC) and the user computing device 1 deposit information.

Based on the user computing device 1 awards percentage of 5% and the reward balance of 100 FXC, the stake account manager 52 determines that the rewards owed to the user computing device 1 are 5 FXC (e.g., 5% of 100 FXC rewards). The stake account manager 52 further determines that the user computing device 1 has deposited 100 FXC to the stake account n, therefore the maximum withdrawal amount for the user computing device 1 is 105 FXC.

Because the user computing device 1's withdrawal request for 115 FXC is unauthorized, the request is canceled. Alternatively, the stake account manager 52 returns an error message alerting the user computing device to the maximum withdrawal amount possible and queries the user computing device 1 as to whether it would like to adjust the amount requested to be within that amount.

Alternatively, based on user computing device 1's contracted terms, it may not be able to withdraw some or all of its initial deposit. For example, the 100 FXC deposit could be considered "non-refundable" and only rewards withdrawals are possible. As another example, the user computing device 1 may have to wait until a certain amount of rewards (e.g., 20 FXC or more) are available in order to make a withdrawal of rewards.

Figure 11:
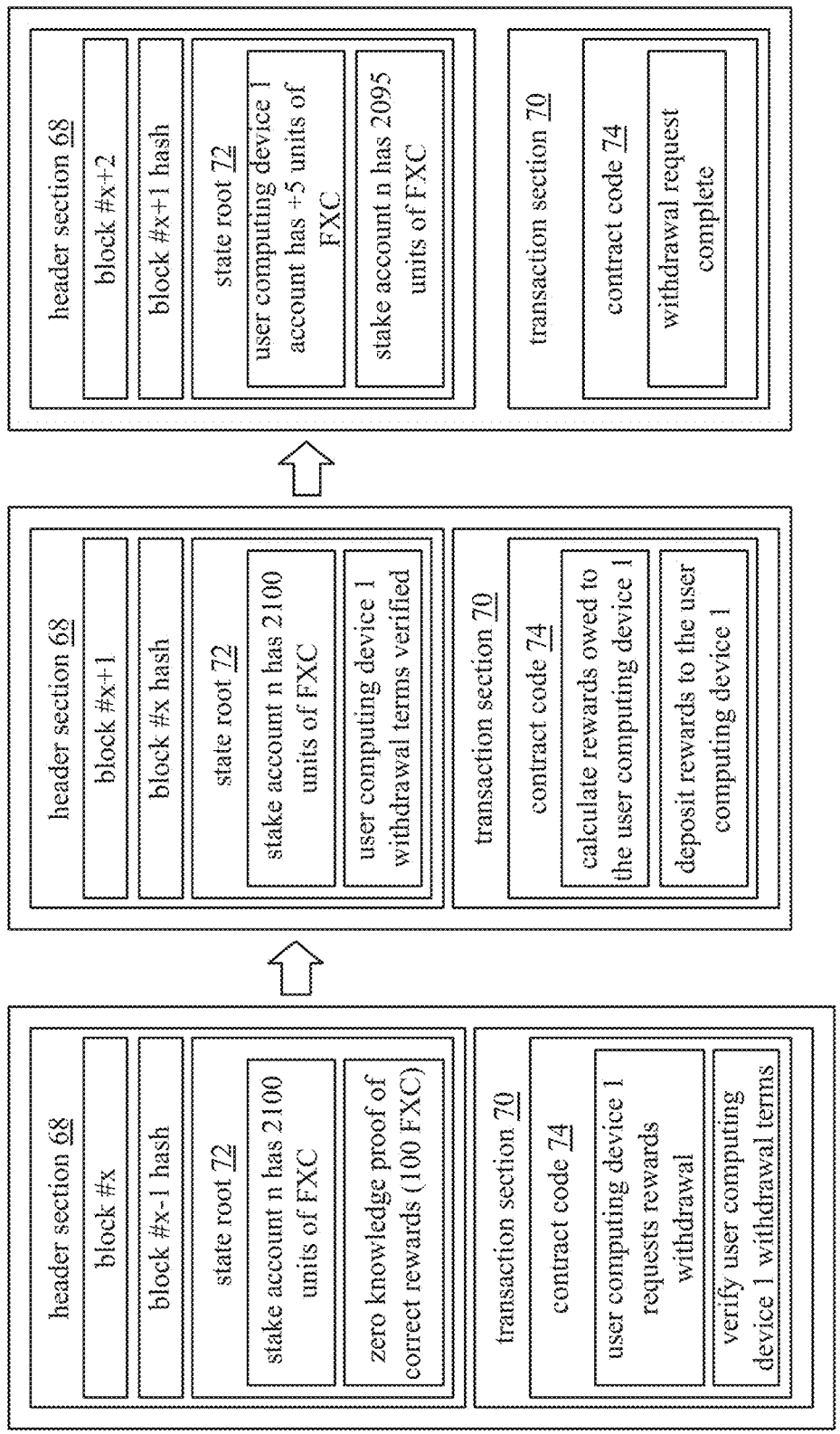
FIG. 11 is a schematic block diagram of an "on-chain" stake account withdrawal in accordance with the present invention.

FIG. 11 is a schematic block diagram of an "on-chain" stake account withdrawal. A stake account is a blockchain smart contract such as a smart contract on the Ethereum blockchain. An Ethereum block includes a header section 68 and a transaction section 70. The header section 68 includes these states in a root hash value (i.e., the state root 72) which summarizes the state changes of smart contracts. The header section 68 further includes other identifying information such as a block number and a hash of a previous block.

The transaction section 70 in Ethereum includes a nonce (a unique transaction identifier), an address of a recipient account, a value, a sending account's signature, code to be run (e.g., contract code 74), mining related fields (e.g., start gas and gas price), and possibly some data (e.g., input values for the code). Here, the transaction section 70 is shown as including the contract code 74 for simplicity.

Referring to the example of FIG. 10 where rewards have previously been deposited into stake account n and the individual staking entity rewards have not been previously calculated, the user computing device 1 requests a withdrawal of rewards owed. The withdrawal request begins with block #x. The header section 68 of block #x includes a hash of block #x−1 and a state root 72 which includes a current summary of the states of the accounts of the system. For example, the summary includes current balances of stake accounts of the system and zero knowledge proofs of rewards calculations. As a specific example, the summary states that stake account n has a balance of 2100 units of FXC and a zero knowledge proof of rewards calculation to prove that the 100 FXC deposited as rewards were calculated correctly.

The transaction section 70 of block #x includes contract code 74 which includes code that the user computing device 1 is requesting a withdrawal of rewards from the stake account n and that the stake manager needs to verify user computing device 1's withdrawal terms. The stake account manager 52 accesses the user computing device 1 withdrawal terms to determine whether the user computing device is authorized to make a rewards withdrawal, whether the time of withdrawal is appropriate, and whether the withdrawal can be "on-chain."

The header section 68 of block #x+1 includes a hash of block #x and a state root 72. The state root 72 includes information pertaining to the current states of the one or more stake account. For example, the state root 72 of block #n+1 states that stake account n has 2100 units of FXC and that user computing device 1's withdrawal was verified by the stake account manager.

The transaction section 70 of block #x+1 includes contract code 74 which indicates that the stake account manager 52 proceeds with the request by calculating the rewards owed to the user computing device 1 and deposits the rewards to the user computing device 1. To calculate the rewards owed, the stake account manager accesses the user computing device 1 awards percentage from reward information 78-n. Based on the user computing device 1 awards percentage of 5%, the stake account manager 52 determines that the rewards owed are 5 FXC (e.g., 5% of 100 FXC rewards). In this example, the withdrawal is approved for "on-chain" therefore, the 5 units of FXC are deposited to the user computing device 1.

The header section 68 of block #x+2 includes a hash of block #x+1 and a state root 72. The state root 72 includes information pertaining to the current states of the one or more stake accounts. For example, the state root 72 of block #x+2 states that the stake account n balance was adjusted to deduct the rewards owed to the user computing device 1 (e.g., stake account n now has a balance of 2095 FXC) and that the user computing device 1 account now includes the 5 units of FXC. The transaction section 70 of block #x+2 includes contract code 74 which indicates that the withdrawal is complete.

FIG. 12 is a flowchart of an example of a method of calculating stake account rewards. The method begins with step 92 where a stake account manager (e.g., the rewards calculation module of the stake account manager) of the secure and trusted cryptocurrency acceptance system determines to distribute rewards to one or more stake accounts of a stake pool of the secure and trusted cryptocurrency acceptance system. A stake account of the one or more stake accounts is a smart contract on a blockchain (e.g., the Ethereum blockchain). The stake account is associated with a network cryptocurrency wallet of the secure and trusted cryptocurrency acceptance system. One or more staking entities store system specific cryptocurrency (e.g., Flexacoin (FXC)) in the stake account for purposes of backing financial transactions of the network cryptocurrency wallet within the secure and trusted cryptocurrency acceptance system.

The stake account manager determines to distribute rewards to the one or more stake accounts based on one or more of: a predetermined time (i.e., daily, weekly, etc.), a request by a staking entity (e.g., through a stake account withdrawal request), and/or a triggering event. A triggering event includes one or more of: completion of a certain amount of successful transactions, reaching a certain amount of incoming transaction fees, reaching a certain rewards balance, a staking entity contract term, etc.

The method continues with step 94 where the stake account manager obtains privately stored stake account information of the one or more stake accounts and a rewards balance of the stake pool. An amount of transaction fees deposited into the stake pool are converted into the system specific cryptocurrency to produce rewards of the rewards balance. A transaction fee of the amount of transaction fees deposited into the stake pool is deposited into the stake pool based on a successful financial transaction of the secure and trusted cryptocurrency acceptance system.

The privately stored stake account information includes balance information, rewards information, staking entity information, and an event log. The balance information includes how much system specific cryptocurrency is available for backing transactions, how much system specific cryptocurrency is locked due to pending transactions, and how much system specific cryptocurrency is deposited as rewards. The rewards information includes rewards percentages per successful transaction, terms of rewards withdrawals, transaction fee rates, staking entity rewards percentage, information pertaining to the successful transactions that have occurred per payee at a given time (e.g., T), etc. For example, payees may pay different transaction fees for successful transactions completed by different network cryptocurrency wallets. Further, different payees may pay different transaction fees to the same network cryptocurrency wallets.

Rewards information also includes rewards deposit preferences. Rewards deposit preferences may include one or more of: times of rewards deposits (e.g., automated (e.g., once a week), manual, etc.), one or more triggering events that initiate a rewards deposit, staking entity rewards percentages, etc. Staking entity information includes identities of staking entities associated with the stake account, staking entity permissions, staking entity withdrawal information (e.g., whether a withdrawal can be on-chain or off-chain, identification of those authorized to initiate a withdrawal, etc.), etc.

The method continues with step 96 where the stake account manager calculates a reward amount of the rewards balance owed to each stake account of the one or more stake accounts based on the privately stored stake account information. For example, the stake account manager accesses the privately stored stake account information to determine that at time T, a stake account has backed transactions with a first payee and a second payee. As per the stake account's rewards information, the first payee has a 1% per successful transaction fee rate for successful transactions with the stake account's network cryptocurrency wallet and the second payee has a 2% per successful transaction fee rate for successful transactions with stake account's network cryptocurrency wallet.

Further, from the rewards information, the stake account manager determines that the first payee has completed 500 units worth of successful transactions with the stake account's network cryptocurrency wallet and the second payee has completed 200 units worth of successful transactions with stake account's network cryptocurrency wallet. The stake account manager calculates that the stake account is owed 5 units of FXC rewards based on first payee transactions and 4 units of FXC rewards based on second payee transactions. Therefore, the stake account is owed 9 units of FXC. The stake account manager calculates rewards for other stake accounts similarly. The calculations may further include the steps of determining how much each staking entity of a stake account is owed.

The method continues with step 98 where the stake account manager performs a batched and secure calculation technique on the calculated reward amounts to produce a batched and secure rewards distribution summary. The batched and secure rewards distribution summary ensures that each reward amount is calculated correctly without disclosing the privately stored stake account information. For example, the rewards calculations for one or more stake accounts are batched and compressed using a zero knowledge proof calculation. A zero knowledge proof calculation allows for recipients of the proof to verify that a portion is correct without knowing the details of the calculation.

The method continues with step 100 where the stake account manager publishes the batched and secure rewards distribution summary to the blockchain. The publishing deposits the calculated rewards into stake accounts (e.g., into smart contracts on the Ethereum blockchain) without publishing confidential details such as payee transaction fee rates, amount of successful transactions, etc.

Figure 13:
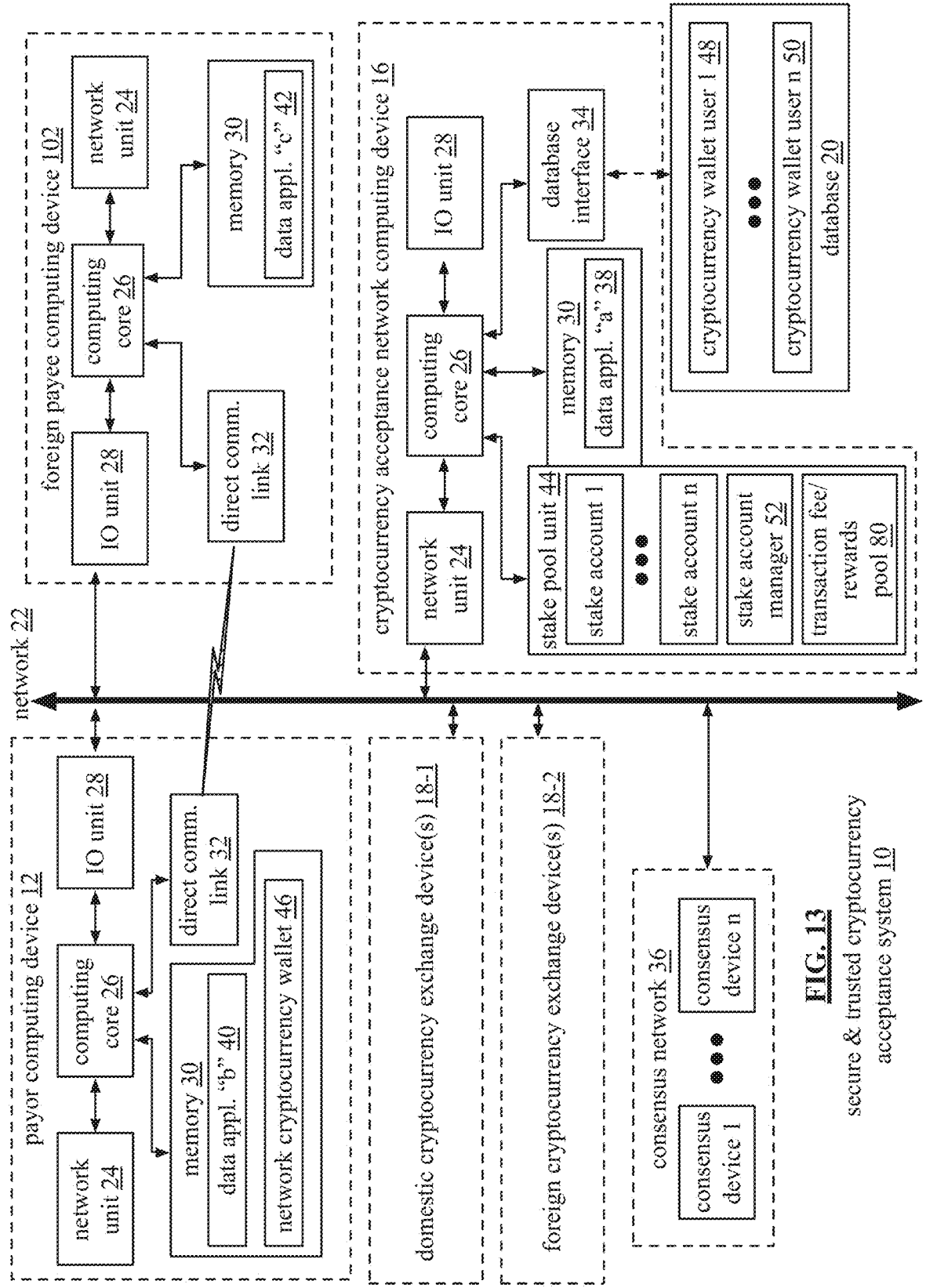
FIG. 13 is a schematic block diagram of another embodiment of the secure & trusted cryptocurrency acceptance system in accordance with the present invention.

FIG. 13 is a schematic block diagram of another embodiment of the secure & trusted cryptocurrency acceptance system 10 that includes a payor computing device 12, a foreign payee computing device 102, a cryptocurrency acceptance network computing device 16, one or more domestic cryptocurrency exchange device(s) 18-1, one or more foreign cryptocurrency exchange device(s) 18-2, a database 20, and a consensus network 36 that includes a plurality of consensus devices 1-n.

The secure & trusted cryptocurrency acceptance system 10 of FIG. 13 operates similarly to the secure & trusted cryptocurrency acceptance system 10 of FIG. 1 except that the secure & trusted cryptocurrency acceptance system 10 of FIG. 13 enables secure and trusted financial transactions between a payor computing device 12 paying with a cryptocurrency and a foreign payee computing device 102 accepting a desired currency (e.g., foreign fiat currency).

The one or more foreign cryptocurrency exchange device(s) 18-2 are located in the same jurisdiction as the foreign payee computing device 102.

The foreign payee computing device 102 may be one or more computing devices having an affiliation with a specific merchant identifier (ID). For example, the foreign payee computing device 102 is a point of sale (POS) device in a foreign retail store associated with a particular merchant having the specific merchant ID. The foreign payee computing device 102 is associated with the cryptocurrency acceptance network computing device 16. For example, the foreign payee computing device 102 has an account with the cryptocurrency acceptance network computing device 16. The account setup establishes data application "c" 42 in the foreign payee computing device 102's memory 30 and includes instructions for securely receiving payments via the secure & trusted cryptocurrency acceptance system 10.

The one or more domestic cryptocurrency exchange device(s) 18-1 and the one or more foreign cryptocurrency exchange device(s) 18-2 are specially licensed entities operable to convert cryptocurrency to a desired currency (e.g., fiat currency, another cryptocurrency, etc.). In an embodiment, the one or more domestic cryptocurrency exchange device(s) 18-1 and the one or more foreign cryptocurrency exchange device(s) 18-2 are associated with one or more cryptocurrency holding companies that are specially licensed to store sensitive materials and have insurance policies to protect against theft and fraud. In another embodiment, one or more domestic cryptocurrency exchange device(s) 18-1 and the one or more foreign cryptocurrency exchange device(s) 18-2 are standalone secure devices.

Licensing, rules, and regulations for cryptocurrency exchange occurs jurisdictionally meaning some cryptocurrencies may be exchangeable for other currencies in one jurisdiction (e.g., a country) but not recognized for exchange in another. For example, Ether (the cryptocurrency of the Ethereum blockchain) may be exchanged for US dollars in the United States but outside of the United States it may not be accepted for exchange into a foreign fiat currency. Likewise, the United States may not have cryptocurrency exchange devices licensed to exchange certain foreign cryptocurrencies for US dollars or other cryptocurrencies.

In order for a payor computing device 12 to conduct financial transactions across jurisdictions, the secure & trusted cryptocurrency acceptance system 10 implements a universally accepted cryptocurrency settlement layer to process financial transactions.

In an example of operation, the payor computing device 12 establishes a direct communication link with the foreign payee computing device 102 via the direct communication link 32. The payor computing device 12 sends the foreign payee computing device 102 a request to initiate purchase of a product or service using cryptocurrency stored in the network cryptocurrency wallet 46. The cryptocurrency stored in the network cryptocurrency wallet 46 is not recognized by the foreign cryptocurrency exchange device(s) 18-2 for exchange. The foreign payee computing device 102 accepts a desired currency (e.g., a foreign fiat currency, etc.).

The request to initiate purchase may be in the form of a split bar code, where the payor computing device 12 maintains one portion of a bar code and the foreign payee computing device 102 maintains another portion of a bar code such that when they are aligned in close proximity, the conveyance is initiated. Having a correct piece of a barcode from the payor computing device 12 as well as the act of alignment, demonstrates intent to enter into a financial transaction (i.e., user authorization). As another example, the request is a secure handshake protocol between the payor computing device 12 and foreign payee computing device 102.

When the request to initiate the financial transaction is approved by the foreign payee computing device 102 (e.g., via the split bar code example), the payor computing device 12 receives an acknowledgement of the financial transaction (e.g., a one-time use code such as a transaction ID) from the foreign payee computing device 102. The one-time use code is one or more of: a unique number, an alpha numeric, a function, and/or any item that uniquely connects the parties in the transaction to the particular transaction. For example, the foreign payee computing device 102 approves the request when the foreign payee computing device 102 is affiliated with the cryptocurrency acceptance network computing device 16, the payor computing device 12 is a trusted computing device (e.g., by verification of ID, certificate, etc.), etc.

When a financial transaction is initiated by the payor computing device 12 using the network cryptocurrency wallet 46, the cryptocurrency acceptance network computing device 16 receives an acknowledgment of the initiation of the financial transaction and a request to process the financial transaction. For example, the payor computing device 12 sends the request to process the financial transaction plus the one-time use code to the cryptocurrency acceptance network computing device 16. The cryptocurrency acceptance network computing device 16 places a hold on an amount of collateral cryptocurrency in a stake account of the stake pool unit 44 associated with the network cryptocurrency wallet 46.

When the amount of collateral cryptocurrency is placed on hold, the cryptocurrency acceptance network computing device 16 sends the payor computing device 12 an acknowledgment that the requisite amount of collateral cryptocurrency is on hold and the financial transaction can proceed. The payor computing device 102 is provided real time exchange rate information for the cryptocurrency to the desired currency requested by the foreign payee computing device 102.

The payor computing device 12 sends an amount of cryptocurrency equal to the amount of desired currency requested by the foreign payee computing device 102 to the cryptocurrency acceptance network computing device 16. Sending the amount of cryptocurrency equal to the amount of desired currency requested by the foreign payee computing device 102 to the cryptocurrency acceptance network computing device 16 is a transaction added to the cryptocurrency blockchain of the cryptocurrency used by the payor computing device 12.

Alternatively, or additionally, the foreign payee computing device 102 sends a notice of the financial transaction which includes the amount of desired currency requested (e.g., an amount of foreign fiat currency) to the cryptocurrency acceptance network computing device 16. The cryptocurrency acceptance network computing device 16 sends the payor computing device 12 a network transaction acknowledgement that the amount of cryptocurrency has been received and is covered by the amount of collateral cryptocurrency placed on hold.

Alternatively, when the amount of desired currency requested is more than the amount of collateral cryptocurrency on hold, the cryptocurrency acceptance network computing device 16 may place further collateral cryptocurrency on hold equal to the amount of desired currency requested if allowed (e.g., by the terms of the stake account associated with the network cryptocurrency wallet 46). If not allowed, the cryptocurrency acceptance network computing device 16 cancels the transaction before the transaction is finalized between the payor computing device 12 and the foreign payee computing device 102.

The payor computing device 12 sends the foreign payee computing device 102 a notification to finalize the transaction. The notification to finalize the transaction includes the network transaction acknowledgement information from the cryptocurrency acceptance network computing device 16 (e.g., the amount of cryptocurrency has been received and is covered by the amount of collateral cryptocurrency placed on hold) such that the foreign payee computing device 102 can close the financial transaction knowing that the desired funds will arrive.

The cryptocurrency acceptance network computing device 16 seeks a desired number of confirmations of payor computing device 12's cryptocurrency payment from the consensus network 20. The desired number of confirmations corresponds to the type of cryptocurrency used. Receipt of the desired number of confirmations may take minutes to hours of time.

The cryptocurrency acceptance network computing device 16 adjusts the amount of collateral cryptocurrency on hold to equal the amount of desired currency requested when the amount of desired currency requested is less than the amount of collateral cryptocurrency on hold.

Concurrently to seeking desired confirmations, the cryptocurrency acceptance network computing device 16 sends the amount of cryptocurrency sent by the payor computing device 12 to the domestic cryptocurrency exchange device(s) 18-1. The domestic cryptocurrency exchange device(s) 18-1 convert the amount of cryptocurrency sent by the payor computing device 12 to an amount of universally accepted cryptocurrency equal to the amount of desired currency requested by the foreign payee computing device 102.

The universally accepted cryptocurrency is a cryptocurrency that is accepted and recognized for exchange by all cryptocurrency exchanges associated with the secure & trusted cryptocurrency acceptance system 10. For example, the universally accepted cryptocurrency is Bitcoin (BTC). Converting cryptocurrency to a universally accepted cryptocurrency allows a payor computing device to transact with payee computing devices across jurisdictions with varying laws and regulations regarding cryptocurrencies. The domestic cryptocurrency exchange device(s) 18-1 send the amount of universally accepted cryptocurrency equal to the amount of desired currency to the foreign cryptocurrency exchange device(s) 18-2.

The foreign cryptocurrency exchange device(s) 18-2 are located in the same jurisdiction as the foreign payee computing device 102 and convert the amount of universally accepted cryptocurrency to the amount of desired requested by the foreign payee computing device 102. Cryptocurrency exchange is done quickly (e.g., 30 seconds to a few minutes) to account for exchange rate volatility. The foreign cryptocurrency exchange device(s) 18-2 deposit the amount equal to the amount of desired currency requested by the foreign payee computing device 102 into a foreign payee banking computing device associated with the foreign payee computing device 102.

When the desired number of confirmations are received by the cryptocurrency acceptance network computing device 16 from the consensus network 36, the cryptocurrency acceptance network computing device 16 releases the hold on the amount of collateral cryptocurrency. If fraudulent activity occurs (e.g., the payor computing device acts maliciously to spend at two payee computing devices simultaneously, the software of the network cryptocurrency wallet 46 is corrupted, etc.) the cryptocurrency acceptance network computing device 16 withdraws the collateral cryptocurrency on hold from the stake account.

As another example, if the payor computing device 12 sends an unauthorized cryptocurrency payment to the cryptocurrency acceptance network computing device 16 through an error in the software of the network cryptocurrency wallet 46, the error may be recognized by the payor computing device 12's network cryptocurrency wallet 46 after finalization of the transaction with the foreign payee computing device 102 but prior to the cryptocurrency acceptance network computing device 16 receiving the desired amount of confirmations.

In that situation, the network cryptocurrency wallet 46 sends a financial transaction failure notification to the cryptocurrency acceptance network computing device 16, the amount of cryptocurrency spent is requested back, and the cryptocurrency acceptance network computing device 16 withdraws the amount of collateral cryptocurrency on hold to cover the transaction that occurred with the foreign payee computing device 102. The universally accepted cryptocurrency settlement layer will be discussed in more detail with reference to FIGS. 14A-16.

Figure 14A:
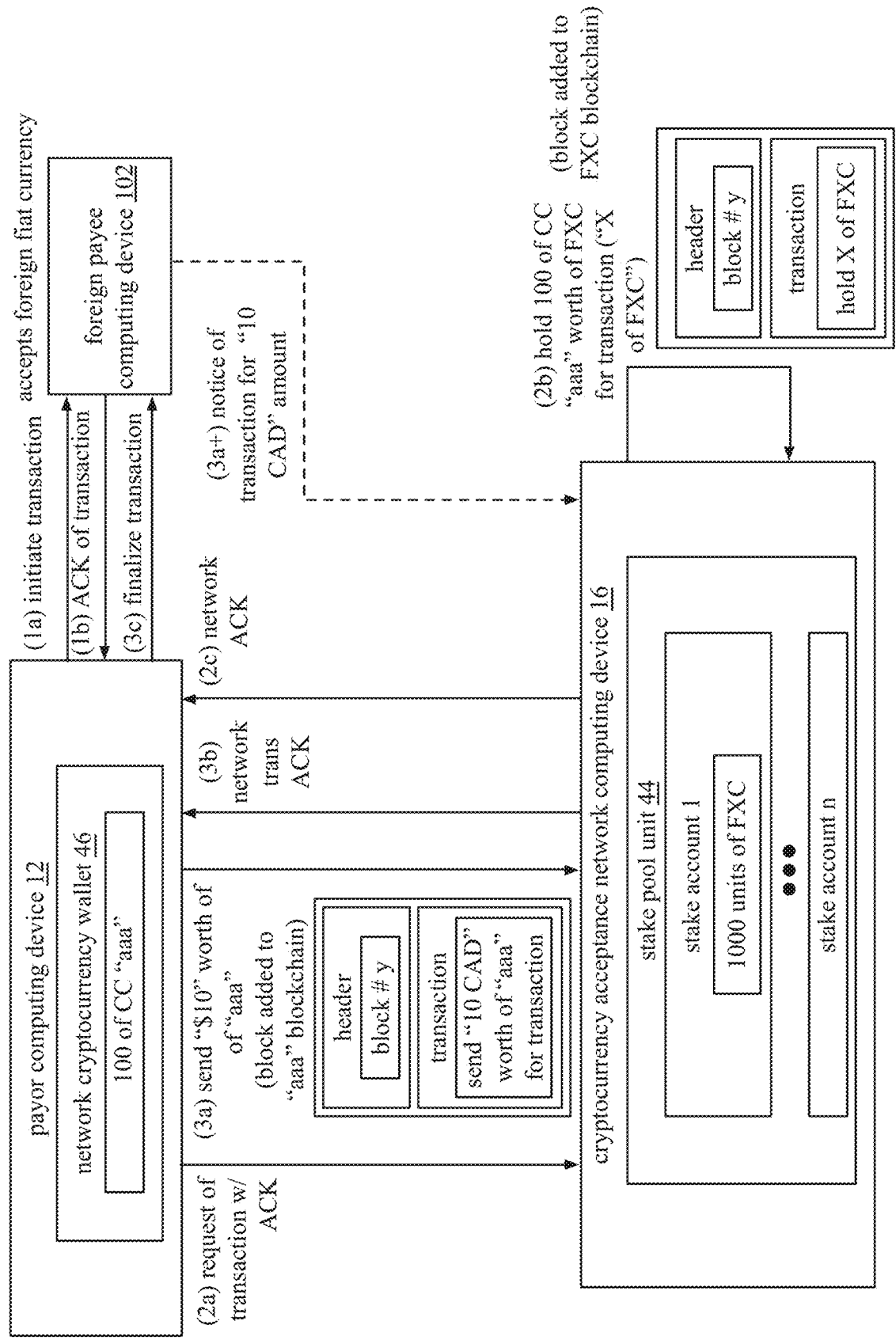
FIGS. 14A-14C are flowcharts of an example of a method of a financial transaction of the secure & trusted cryptocurrency acceptance system in accordance with the present invention.
Figure 14B:
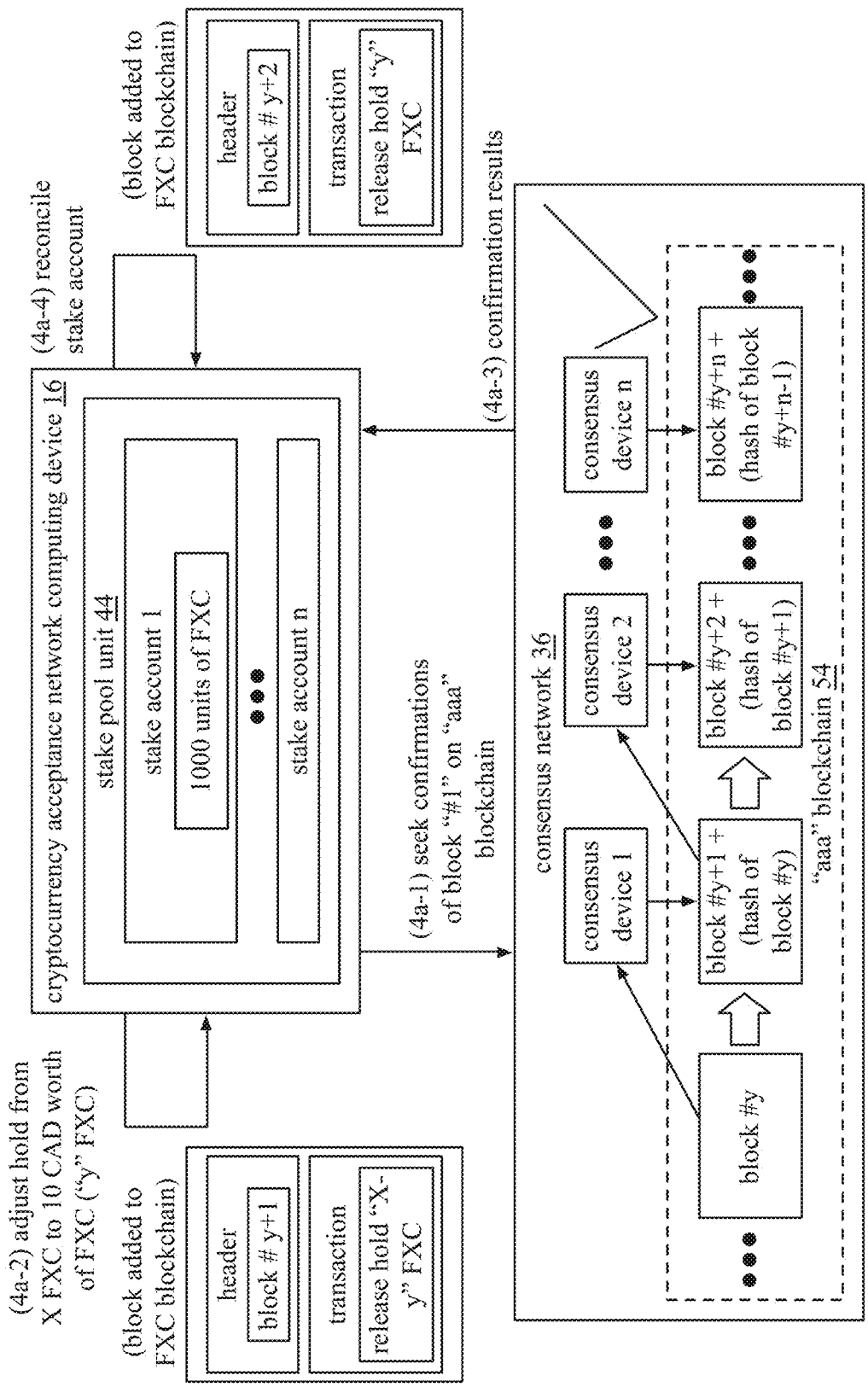
Figure 14C:
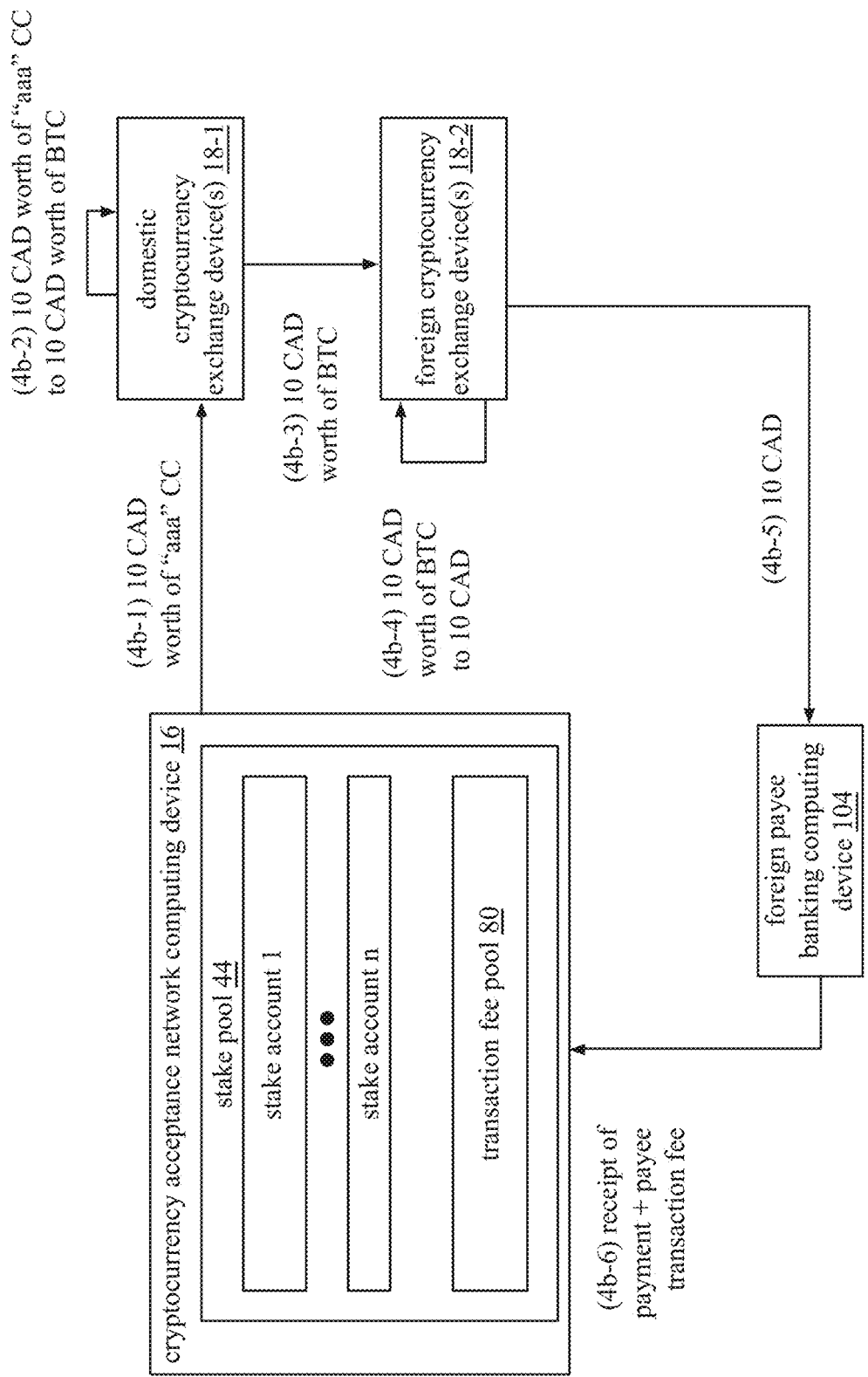

FIGS. 14A-14C are flowcharts of an example of a method of a financial transaction of the secure & trusted cryptocurrency acceptance system 10 of FIG. 13. The method begins on FIG. 14A with step (1a) where the payor computing device 12 establishes a direct communication link with the foreign payee computing device 102 to initiate a financial transaction. The payor computing device 12's network cryptocurrency wallet 46 is storing 100 units of a cryptocurrency (CC) "aaa." Cryptocurrency "aaa" may be any type of cryptocurrency approved for exchange by the one or more domestic cryptocurrency exchange device(s) 18-1. In this example, the payor computing device 12 wishes to pay the foreign payee computing device 102 using cryptocurrency "aaa," but the foreign payee computing device 102 accepts foreign fiat currency (e.g., Canadian dollars). Further, the one or more foreign cryptocurrency exchange device(s) 18-2 in the jurisdiction of the foreign payee computing device 102 do not recognize cryptocurrency "aaa" for exchange.

The request to initiate purchase at step (1a) may be in the form of a split bar code, where the payor computing device 12 maintains one portion of a bar code and the foreign payee computing device 102 maintains another portion of a bar code such that when they are aligned in close proximity, the conveyance is initiated. Having a correct piece of a barcode from the payor computing device 12 as well as the act of alignment, demonstrates intent to enter into a financial transaction (i.e., user authorization). As another example, the request is a secure handshake protocol between the payor computing device 12 and the foreign payee computing device 102.

The method continues at step (1b) where the payor computing device 12 receives an acknowledgement of the financial transaction (e.g., a one-time use code such as a transaction ID) from the foreign payee computing device 102. The one-time use code is one or more of: a unique number, an alpha numeric, a function, and/or any item that uniquely connects the parties in the transaction to the particular transaction. For example, the foreign payee computing device 102 approves the request when the foreign payee computing device 102 is associated with the cryptocurrency acceptance network computing device 16 and the terms of the transaction are valid.

The method continues at step (2a) where, when a financial transaction is initiated by the payor computing device 12 using the network cryptocurrency wallet 46, the cryptocurrency acceptance network computing device 16 receives an acknowledgment of the initiation of the financial transaction and a request to process the financial transaction. For example, the payor computing device 12 sends the request to process the financial transaction plus the one-time use code to the cryptocurrency acceptance network computing device 16.

The cryptocurrency acceptance network computing device 16 includes the stake pool unit 44. The stake pool unit 44 includes a plurality of stake accounts 1-n. Staking entities (e.g., wallet developers, individuals, etc.) pledge an amount of Flexacoin (FXC) cryptocurrency to a stake account for purposes of backing financial transactions of a cryptocurrency wallet's users (i.e., collateral cryptocurrency). Flexacoin cryptocurrency is a token on the Ethereum blockchain developed specifically for use within the secure & trusted cryptocurrency acceptance system 10 as a collateral utility token. A more detailed discussion of the stake pool unit 44 and the plurality of stake accounts 1-n is disclosed with reference to FIGS. 6-12.

In order for a cryptocurrency wallet to be recognized by the secure & trusted cryptocurrency acceptance system 10, the cryptocurrency wallet must be associated with a stake account of the stake pool unit 44. In this example, the network cryptocurrency wallet 46 is associated with stake account 1. For example, the digital wallet developer of the network cryptocurrency wallet 46 and possibly one or more other staking entities have deposited 1000 units of Flexacoin in stake account 1 to back financial transactions of users of the network cryptocurrency wallet 46.

At step (2b), the cryptocurrency acceptance network computing device 16 places a hold on an amount of Flexacoin in stake account 1. In this example, 100 units of cryptocurrency "aaa" worth of Flexacoin (e.g., the total amount of cryptocurrency stored in the network cryptocurrency wallet 46) of the 1000 units of amount of Flexacoin in the stake account 1 is placed on hold to back the financial transaction. The 100 units of cryptocurrency "aaa" worth of Flexacoin is referred to as "X" amount of Flexacoin for simplicity.

For example, if cryptocurrency "aaa" and Flexacoin have a one-to-one conversion, "X" equals 100 units and there is now 900 units of Flexacoin available in stake account 1 to back financial transactions of other users of the network cryptocurrency wallet 46. The information pertaining to the hold on "X" amount of Flexacoin of stake account 1 is added to the stake pool smart contract. Transactions within the smart contract include the data required to publish the state of the stake pool transactions to the blockchain. The contract may also include various other information.

The method continues with step (2c), where, when the "X" amount of Flexacoin is placed on hold, the cryptocurrency acceptance network computing device 16 sends the payor computing device 12 an acknowledgment that the requisite amount of collateral cryptocurrency is on hold and the financial transaction can proceed. If the requisite amount of collateral cryptocurrency cannot be placed on hold (e.g., the stake account does not have enough collateral cryptocurrency available) the cryptocurrency acceptance network computing device 16 sends the payor computing device 12 an error notification and cancels the financial transaction at step (2c).

The method continues with step (3a) where the payor computing device 12 sends the amount of cryptocurrency "aaa" equal to the amount of foreign fiat currency requested by the foreign payee computing device 102 to the cryptocurrency acceptance network computing device 16. In this example, the foreign payee computing device 102 is requesting 10 Canadian dollars (CAD). A block including information pertaining to transfer of "10 CAD" worth of "aaa" cryptocurrency is added to the "aaa" blockchain. The block includes a header section and a transaction section. The header section includes a block number (e.g., block #y) plus a hash of the previous block (not shown). The header section and/or the transaction section may include various other information.

The transaction information of the block includes the payment amount, the address of the sender (the payor computing device 12), and the address of the recipient (the cryptocurrency acceptance network computing device 16). Thus, by using the secure & trusted cryptocurrency acceptance system 10, confidential payee related information (e.g., revenue, items being sold, consumer spending behavior, etc.) and confidential payor related information (e.g., consumer identity, items purchased, amount spent, merchants frequented, etc.) is private (i.e., not published on the blockchain for anyone to see).

Alternatively, or additionally, the foreign payee computing device 102 sends a notice of the financial transaction which includes the amount of desired currency requested (e.g., an amount of Canadian dollars) to the cryptocurrency acceptance network computing device 16 at step (3a+). The method continues with step 3(b) where the cryptocurrency acceptance network computing device 16 sends the payor computing device 12 a network transaction acknowledgement that the amount of cryptocurrency received is covered by the amount of collateral cryptocurrency placed on hold.

Alternatively, if the amount of cryptocurrency received is not covered by the amount of collateral cryptocurrency placed on hold, the cryptocurrency acceptance network computing device 16 may cancel the transaction at 3(b) or place a further amount of Flexacoin on hold to cover the transaction at 3(b) depending on the terms of stake account 1.

In this example, the entire balance of the network cryptocurrency wallet 46 worth of Flexacoin is placed on hold so the payor computing device 12 would not be able to spend more than the amount placed on hold. However, in other examples where the amount of collateral cryptocurrency placed on hold is based on other factors (e.g., merchant ID, typical transaction amounts, etc.), the payor computing device 12 may initiate a transaction for more than what is placed on hold. The terms of the stake account 1 indicate how to proceed in such cases. For example, the stake account 1 may indicate that a user of the network cryptocurrency wallet 46 has a particular spending cap on any individual purchase. Any request that requires a hold on over the spending cap is rejected. However, for a request equal to or lower than the spending cap, additional collateral cryptocurrency is placed on hold so that the transaction can proceed.

The method continues with step 3(c) where the payor computing device 12 sends the foreign payee computing device 102 a notification to finalize the transaction. The notification to finalize the transaction includes the network transaction acknowledgement information from the cryptocurrency acceptance network computing device 16 (e.g., the amount of cryptocurrency has been received and is covered by the amount of collateral cryptocurrency placed on hold) such that the foreign payee computing device 102 can close the financial transaction knowing that the desired funds will arrive.

The method continues on FIG. 14B with step (4a-1) where the cryptocurrency acceptance network computing device 16 seeks a desired number of confirmations of block #y added to the "aaa" blockchain 54 from the consensus network 36. The consensus network 36 includes a plurality of consensus devices 1-n. For example, in the Bitcoin blockchain, miners record new transactions into blocks that verify all previous transactions within the blockchain. On average, it takes a miner ten minutes to write a block on the Bitcoin blockchain and the average block time depends on a total hash power of the Bitcoin network.

The desired number of confirmations corresponds to the type of cryptocurrency used. As shown here, the cryptocurrency acceptance network computing device 16 requires "n" confirmations before block #1 on the "aaa" blockchain 54 is considered confirmed. Receipt of the desired number of confirmations may take minutes to hours of time. However, because every financial transaction is backed with Flexacoin as collateral, the cryptocurrency acceptance network computing device 16 proceeds with the financial transaction and trusts that the desired amount of confirmations will be received.

The method continues at step (4a-2) where the cryptocurrency acceptance network computing device 16 adjusts the X amount of Flexacoin on hold to equal 10 CAD worth of Flexacoin. 10 CAD worth of Flexacoin is referred to as "y" amount of Flexacoin for simplicity. For example, when the conversion rate between Flexacoin and Canadian dollars is one-to-one, and X is equal to 100, the cryptocurrency acceptance network computing device 16 releases the hold on 90 units of Flexacoin (i.e., "X-y") such that only 10 units of Flexacoin are on hold. The information pertaining to releasing the hold on "X-y" amount of Flexacoin of stake account 1 is added to the stake pool smart contract. Transactions within the smart contract include the data required to publish the state of the stake pool transactions to the blockchain. The contract may also include various other information.

The method continues with step (4a-3) where the desired number of confirmations are received by the cryptocurrency acceptance network computing device 16 from the consensus network 36. The method continues with step (4a-4) where the cryptocurrency acceptance network computing device 16 releases the hold on the "y" amount of Flexacoin of stake account 1. A block including information pertaining to releasing the hold on "y" amount of Flexacoin of stake account 1 is added to the Flexacoin blockchain. For simplicity, the block includes a header section that includes a block number (e.g., block #y+2) and a transaction section.

Concurrently with seeking desired confirmations in step (4a-2) on FIG. 14B, the method continues with step (4b-1) on FIG. 14C where the cryptocurrency acceptance network computing device 16 sends the 10 CAD worth of cryptocurrency "aaa" sent by the payor computing device 12 to the domestic cryptocurrency exchange device(s) 18-1. The method continues with step (4b-2) where the domestic cryptocurrency exchange device(s) 18-1 convert the 10 CAD worth of cryptocurrency "aaa" sent by the payor computing device 12 to a universally accepted cryptocurrency. For example, the universally accepted cryptocurrency is Bitcoin (BTC).

The method continues with step (4b-3) where the domestic cryptocurrency exchange device(s) 18-1 sends the 10 CAD worth of universally accepted cryptocurrency (BTC)

to the foreign cryptocurrency exchange device(s) 18-2. The method continues with step (4b-4) where the foreign cryptocurrency exchange device(s) 18-2 convert the 10 CAD worth of universally accepted cryptocurrency (BTC) to 10 CAD. Cryptocurrency exchange is done quickly (e.g., seconds to a few minutes) to account for exchange rate volatility. The exchange can also be performed in real time on a credit-based account to eliminate any pricing volatility. Further, the payor computing device 12 is made are aware of the exchange rate for "aaa" CC to Canadian dollars in real time.

The method continues with step (4b-5), where the foreign cryptocurrency exchange device(s) 18-2 deposit the 10 CAD into a foreign payee banking computing device 104 associated with the foreign payee computing device 102. Alternatively, the foreign cryptocurrency exchange device(s) 18-2 deposit the 10 CAD into a Flexa banking computing device 55 (e.g., a secure & trusted cryptocurrency acceptance system 10 banking computing device) and the Flexa banking computing device 55 deposits the 10 CAD into the foreign payee banking computing device 104. The method continues with step (4b-6) where the foreign payee banking computing device 104 sends a receipt of the deposit of the 10 CAD plus a transaction fee to the cryptocurrency acceptance network computing device 16. The transaction fee is stored in the transaction fee/rewards pool 80 of the stake pool unit 44 for rewards calculation and distribution.

Figure 15:
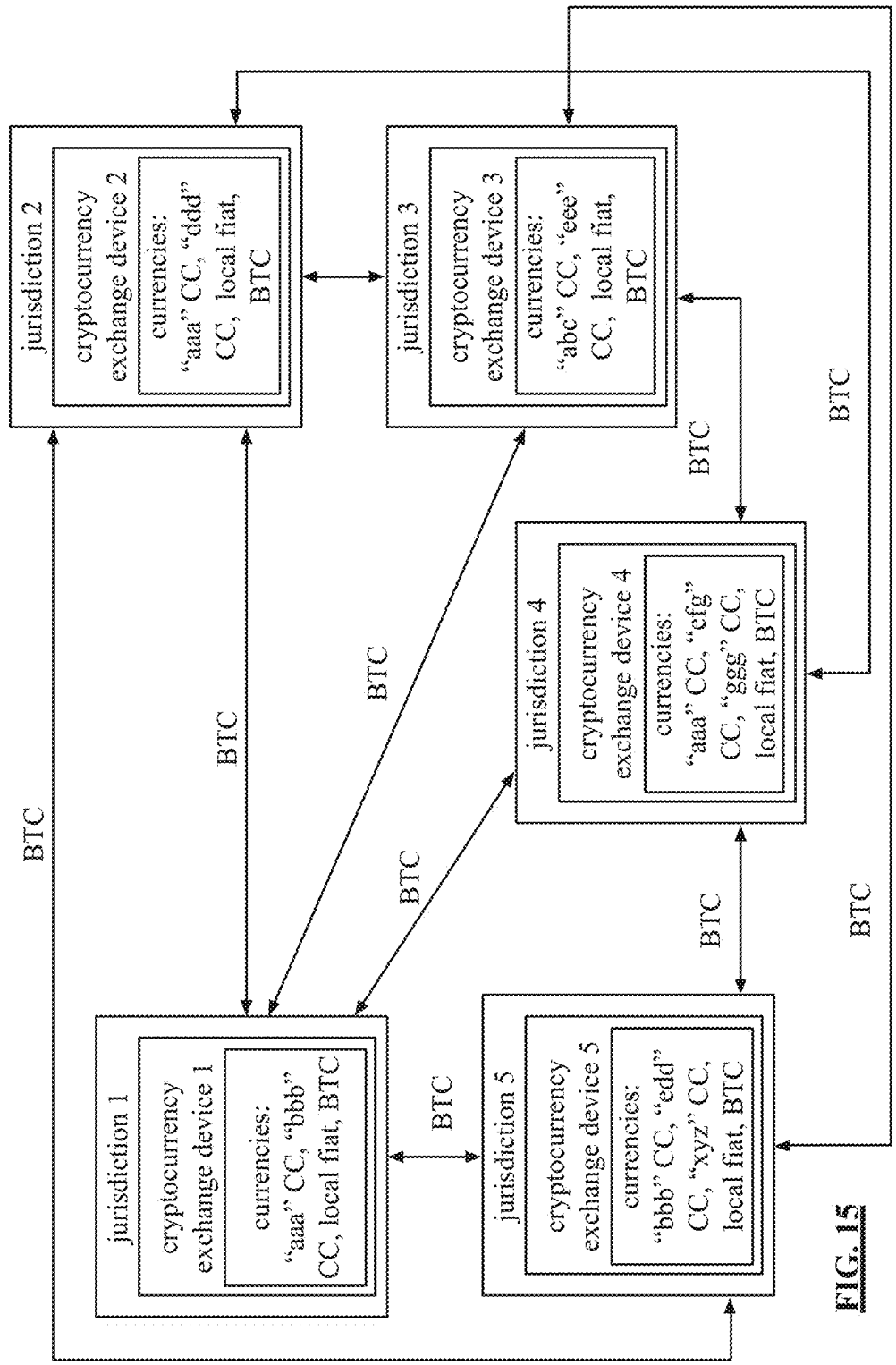
FIG. 15 is a schematic block diagram of an embodiment of a worldwide network of cryptocurrency exchange devices of the secure & trusted cryptocurrency acceptance system in accordance with the present invention.

FIG. 15 is a schematic block diagram of an embodiment of a worldwide network of cryptocurrency exchange devices of the secure & trusted cryptocurrency acceptance system 10 that includes cryptocurrency exchange devices 1-5 located in jurisdictions 1-5. A cryptocurrency exchange device is operable to convert one or more cryptocurrencies to other currencies (e.g., fiat currencies or other cryptocurrencies). Licensing, rules, and regulations for cryptocurrency exchange occurs jurisdictionally meaning some cryptocurrencies may be exchangeable for other currencies in one jurisdiction (e.g., a country) but not recognized for exchange in another.

For example, in jurisdiction 1, cryptocurrency exchange device 1 recognizes and is operable to convert the following currencies: "aaa" cryptocurrency (CC), "bbb" cryptocurrency (CC), local fiat currency, and Bitcoin (BTC). In jurisdiction 2, cryptocurrency exchange device 2 recognizes and is operable to convert the following currencies: "aaa" cryptocurrency (CC), "ddd" cryptocurrency (CC), local fiat currency, and Bitcoin (BTC). In jurisdiction 3, cryptocurrency exchange device 3 recognizes and is operable to convert the following currencies: "abc" cryptocurrency (CC), "eee" cryptocurrency (CC), local fiat currency, and Bitcoin (BTC). In jurisdiction 4, cryptocurrency exchange device 4 recognizes and is operable to convert the following currencies: "aaa" cryptocurrency (CC), "ggg" cryptocurrency (CC), local fiat currency, and Bitcoin (BTC). In jurisdiction 5, cryptocurrency exchange device 5 recognizes and is operable to convert the following currencies: "bbb" cryptocurrency (CC), "edd" cryptocurrency (CC), "xyz" cryptocurrency (CC), local fiat currency, and Bitcoin (BTC).

While there is some overlap in the what currencies are recognized across jurisdictions (e.g., jurisdictions 1, 2, and 4 recognize "aaa" CC), a problem occurs when a payor from one jurisdiction wishes to transact with a payee in another jurisdiction using a currency that is not recognized for exchange in the payee's jurisdiction. For example, a payor from jurisdiction 5 wishes to pay a payee from jurisdiction 1 using "xyz" CC. Cryptocurrency exchange device 1 does not recognize or accept "xyz" CC for exchange.

To solve this problem, when a financial transaction occurs between a payor using a cryptocurrency and a payee in a jurisdiction that cannot exchange the cryptocurrency, the cryptocurrency exchange device in the payor's jurisdiction first converts the cryptocurrency to a universally accepted cryptocurrency (e.g., Bitcoin (BTC)). A cryptocurrency exchange in the payee's jurisdiction is then operable to convert the universally accepted cryptocurrency to the desired currency of the payee. For example, the cryptocurrency exchange device 5 converts the "xyz" CC to universally accepted cryptocurrency BTC and sends the BTC to the cryptocurrency exchange device 1. The cryptocurrency exchange device 1 converts the BTC to the desired currency of the payee (e.g., local fiat currency).

This multiple-step conversion is referred to as a universally accepted cryptocurrency settlement layer of the secure & trusted cryptocurrency acceptance system 10. The universally accepted cryptocurrency settlement layer is shown here as the arrows between jurisdictions indicating that a universally accepted cryptocurrency (e.g., Bitcoin (BTC)) can be exchanged across jurisdictions 1-5 for conversion to whatever currencies are accepted by a particular jurisdiction. The universally accepted cryptocurrency settlement layer allows for fast, trusted, and secure cryptocurrency transactions worldwide.

As long as a jurisdiction has a cryptocurrency exchange that is associated with the secure & trusted cryptocurrency acceptance system 10 (e.g., via an account with the cryptocurrency acceptance network device 16) that accepts the universally accepted cryptocurrency for exchange, cryptocurrency financial transactions initiated using unrecognized/foreign cryptocurrencies can occur there.

FIG. 16 is a schematic block diagram of another embodiment of the secure & trusted cryptocurrency acceptance system 10 that includes a domestic payor computing device 12, the cryptocurrency acceptance network computing device 16, one or more domestic cryptocurrency exchange device(s) 18-1, a plurality of domestic payees computing devices 14-1 through 14-n, a plurality of domestic payee banking devices 56-1 through 56-n, one or more foreign cryptocurrency exchange device(s) 18-2, a plurality of foreign payee computing devices 102-1 through 102-n, and a plurality of foreign payee banking computing devices 104-1 through 104-n.

The cryptocurrency acceptance network computing device 16 is associated with the domestic payor computing device 12, the one or more domestic cryptocurrency exchange device(s) 18-1, the one or more domestic cryptocurrency exchange device(s) 18-1, the plurality of domestic payees computing devices 14-1 through 14-n, the plurality of domestic payee banking devices 56-1 through 56-n the plurality of foreign cryptocurrency exchange devices 1-n, the plurality of foreign payee computing devices 1-n, and the plurality of foreign payee banking computing devices 1-n.

The network created by the cryptocurrency acceptance network computing device 16 associations allows for the domestic payor computing device 12 to engage in fast, easy, and reliable financial transactions with domestic payee computing devices and foreign payee computing devices. This is achieved through the universally accepted cryptocurrency settlement layer discussed in FIGS. 13-15.

While engaging in financial transactions outside of the domestic payor computing device 12's country with one or more of the foreign payee devices 102-1 through 102-n, the domestic payor computing device 102 is provided real time exchange rates through the connection of the domestic and foreign cryptocurrency exchange devices via the cryptocurrency acceptance network computing device 16.

The methods of the secure & trusted cryptocurrency acceptance system 10 (e.g., the stake pool, the universally accepted cryptocurrency settlement layer, etc.) allow for replicability and scalability of the secure & trusted cryptocurrency acceptance system 10 across a plurality of jurisdictions worldwide.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

initiating, by a payor computing device of a secure and trusted cryptocurrency acceptance system, a financial transaction to send payment of a particular amount to a payee computing device of the secure and trusted cryptocurrency acceptance system using a first cryptocurrency, wherein a network cryptocurrency wallet of the payor computing device stores the first cryptocurrency, and wherein the payee computing device accepts a desired currency;

receiving, by a cryptocurrency acceptance network computing device of the secure and trusted cryptocurrency acceptance system, a request to process the financial transaction;

placing, by the cryptocurrency acceptance network computing device, a hold on an amount of collateral cryptocurrency based on the request to process the financial transaction, wherein the network cryptocurrency wallet is associated with a stake account of a plurality of stake accounts of a stake pool of the cryptocurrency acceptance network computing device, and wherein one or more staking entities store collateral cryptocurrency in the stake account for purposes of backing financial transactions of the network cryptocurrency wallet;

sending, by the cryptocurrency acceptance network computing device, a first network acknowledgment of the financial transaction to the payor computing device, wherein the first network acknowledgment verifies the amount of the collateral cryptocurrency is on hold;

sending, by the payor computing device, a first amount of the first cryptocurrency equal to the particular amount to the cryptocurrency acceptance network computing device;

sending, by the cryptocurrency acceptance network computing device, a second network acknowledgment of the financial transaction to the payor computing device, wherein the second network acknowledgment verifies that the first amount of the first cryptocurrency is covered by the amount of the collateral cryptocurrency on hold;

sending, by the payor computing device, a finalize instruction for the financial transaction to the payee computing device;

seeking, by the cryptocurrency acceptance network computing device, a desired number of confirmations of the first amount of the first cryptocurrency from a consensus network of the secure and trusted cryptocurrency acceptance system;

sending, by the cryptocurrency acceptance network computing device, the first amount of the first cryptocurrency to a cryptocurrency exchange device of the secure and trusted cryptocurrency acceptance system;

converting, by the cryptocurrency exchange device, the first amount of the first cryptocurrency to an amount of the desired currency equal to the particular amount;

sending, by the cryptocurrency exchange device, the amount of the desired currency to a payee banking computing device associated with the payee computing device for deposit therein;

sending, by the payee banking computing device, a receipt of the deposit to the cryptocurrency acceptance network computing device; and when the desired number of confirmations of the first amount of the first cryptocurrency is completed by the consensus network:

releasing, by the cryptocurrency acceptance network computing device, the hold on the amount of the collateral cryptocurrency.

2. The method of claim 1, wherein the initiating the financial transaction comprises:
establishing, by the payor computing device, a direct link with the payee computing device;
sending, by the payor computing device, a request to initiate the financial transaction to the payee computing device; and
receiving, by the payor computing device, a one-time use code approving initiation of the financial transaction from the payee computing device.

3. The method of claim 2 further comprises:
sending, by the payor computing device, the request to process the financial transaction to the cryptocurrency acceptance network computing device, wherein the request to process the financial transaction includes the one-time use code.

4. The method of claim 1, wherein the desired currency includes one of:
fiat currency; and
a cryptocurrency recognized by the cryptocurrency exchange device.

5. The method of claim 1, wherein the placing the hold on the amount of the collateral cryptocurrency based on the request comprises:
determining, by the cryptocurrency acceptance network computing device, the amount of the collateral cryptocurrency based on one or more of:
a default hold amount based on one or more of the network cryptocurrency wallet and the payee computing device;
characteristics of the payor computing device;
characteristics of the payee computing device;
characteristics of the stake account; and
a total amount of first cryptocurrency stored by the network cryptocurrency wallet.

6. The method of claim 1, wherein the one or more staking entities include one or more of:
a developer of the network cryptocurrency wallet;
a developer of one or more other network cryptocurrency wallets of the secure and trusted cryptocurrency acceptance system; and
a user computing device of the secure and trusted cryptocurrency acceptance system.

7. The method of claim 1 further comprises:
when the amount of collateral cryptocurrency on hold is greater than the first amount of the first cryptocurrency sent to the cryptocurrency acceptance network computing device:
adjusting, by the cryptocurrency acceptance network computing device, the amount of collateral cryptocurrency on hold to equal the first amount of the first cryptocurrency.

8. The method of claim 1 further comprises:
notifying, by the payee computing device, the cryptocurrency acceptance network computing device of the particular amount; and
when the amount of collateral cryptocurrency on hold is greater than the particular amount:
adjusting, by the cryptocurrency acceptance network computing device, the amount of collateral cryptocurrency on hold to equal the particular amount.

9. The method of claim 1, wherein the finalize instruction includes the second network acknowledgment of the financial transaction.

10. The method of claim 1 further comprises:
when the desired number of confirmations of the first amount of the first cryptocurrency is not completed:
withdrawing, by the cryptocurrency acceptance network computing device, the amount of the collateral cryptocurrency from the stake account.

11. The method of claim 1 further comprises:
receiving, by the cryptocurrency acceptance network computing device, a financial transaction failure notification from the network cryptocurrency wallet after the finalize instruction for the financial transaction is sent by the payor computing device;
withdrawing, by the cryptocurrency acceptance network computing device, the amount of the collateral cryptocurrency from the stake account;
sending, by the cryptocurrency acceptance network computing device, the amount of the collateral cryptocurrency to the cryptocurrency exchange device;
converting, by the cryptocurrency exchange device, the amount of the collateral cryptocurrency to the amount of the desired currency equal to the particular amount; and
sending, by the cryptocurrency exchange device, the amount of the desired currency to the payee banking computing device associated with the payee computing device for deposit therein.

12. The method of claim 1 further comprises:
when the amount of the collateral cryptocurrency on hold is less than the particular amount:
determining, by the cryptocurrency acceptance network computing device, whether the financial transaction is allowed; and
when the financial transaction is allowed:
placing, by the cryptocurrency acceptance network computing device, additional collateral cryptocurrency from the stake account on hold such that the amount of the collateral cryptocurrency on hold plus the additional collateral cryptocurrency is equal to the particular amount; and
when the financial transaction is not allowed:
canceling, by the cryptocurrency acceptance network computing device, the financial transaction.

13. The method of claim 1, wherein the sending the receipt of the deposit to the cryptocurrency acceptance network computing device further comprises:
sending, by the payee banking computing device, a transaction fee on behalf of the payee computing device to the cryptocurrency acceptance network computing device;
purchasing, by the cryptocurrency acceptance network computing device, an amount of system specific cryptocurrency with the transaction fee; and
depositing, by the cryptocurrency acceptance network computing device, the amount of the system specific cryptocurrency to the stake pool as stake pool rewards.

14. The method of claim 1 further comprises:
sending, by the cryptocurrency exchange device, the amount of the desired currency to a secure and trusted cryptocurrency acceptance system banking computing device for deposit therein; and
sending, by the secure and trusted cryptocurrency acceptance system banking computing device, the amount of the desired currency to the payee banking computing device associated with the payee computing device for deposit therein.

* * * * *